(12) United States Patent
Pan et al.

(10) Patent No.: US 11,895,591 B2
(45) Date of Patent: Feb. 6, 2024

(54) METHOD AND APPARATUS FOR CONFIGURING SIDELINK DISCONTINUOUS RECEPTION IN A WIRELESS COMMUNICATION SYSTEM

(71) Applicant: ASUSTek Computer Inc., Taipei (TW)

(72) Inventors: Li-Te Pan, Taipei (TW); Li-Chih Tseng, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 41 days.

(21) Appl. No.: 17/546,646

(22) Filed: Dec. 9, 2021

(65) Prior Publication Data

US 2022/0191794 A1 Jun. 16, 2022

Related U.S. Application Data

(60) Provisional application No. 63/175,208, filed on Apr. 15, 2021, provisional application No. 63/165,997, (Continued)

(51) Int. Cl.
*H04W 52/02* (2009.01)
*H04W 28/24* (2009.01)
*H04W 92/18* (2009.01)

(52) U.S. Cl.
CPC ....... *H04W 52/0232* (2013.01); *H04W 28/24* (2013.01); *H04W 92/18* (2013.01)

(58) Field of Classification Search
CPC . H04W 28/24; H04W 52/0232; H04W 76/23; H04W 76/28; H04W 92/18
See application file for complete search history.

(56) References Cited

U.S. PATENT DOCUMENTS 11,770,772 B2 * 9/2023 Li .................. H04W 76/14
370/318
2021/0227620 A1 * 7/2021 Pan .................. H04W 4/40
(Continued)

OTHER PUBLICATIONS

European Search Report in corresponding EP Application No. 21213291.4, dated May 6, 2022.
(Continued)

*Primary Examiner* — Liton Miah
(74) *Attorney, Agent, or Firm* — Cooper Legal Group LLC

(57) ABSTRACT

A method and device are disclosed for a User Equipment (UE) to sidelink discontinuous reception (DRX) for sidelink groupcast communication associated with a group. In one embodiment, the method includes the UE assuming or considering a sidelink DRX configuration applied for the sidelink groupcast communication associated with the group, wherein the sidelink DRX configuration comprises at least one of an on-duration timer length used for determining an on-duration at the beginning of each sidelink DRX cycle and/or a cycle length used for determining a length of each sidelink DRX cycle. The method also includes the UE deriving or determining a time to start of on-duration for each sidelink DRX cycle or start of each sidelink DRX cycle based on at least an identifier associated with the group. The method further includes the UE transmitting a sidelink control information associated with the group on a sidelink control channel in a period, wherein the period is determined based on the SL DRX configuration and the time to start of on-duration for each sidelink DRX cycle or start of each sidelink DRX cycle.

20 Claims, 28 Drawing Sheets

Related U.S. Application Data filed on Mar. 25, 2021, provisional application No. 63/123,976, filed on Dec. 10, 2020.

(56) References Cited

U.S. PATENT DOCUMENTS

| | | | | |
|---|---|---|---|---|
| 2022/0369417 A1* | 11/2022 | Park | ................ | H04W 28/0268 |
| 2023/0014303 A1* | 1/2023 | Di Girolamo | ........ | H04W 72/20 |
| 2023/0088615 A1* | 3/2023 | Zhao | ................ | H04W 52/0229 |
| | | | | 370/311 |

OTHER PUBLICATIONS

Fujitsu: "Sidelink DRX for Power Saving" 3GPP Draft; R2-2009133, 3rd Generation Partnership Project (3GPP), Mobile Competence Centre; 650, Route Des Lucioles; F-06921 Sophia-Antipolis Cedex; France, vol. RAN WG2, No. e-Meeting; Nov. 2, 2020-Nov. 13, 2020, Oct. 21, 2020, XP051940893.

"3rd Generation Partnership Project; Technical Specification Group Radio Access Network; NR; NR and NG-RAN Overall Description; Stage 2 (Release 16)", 3GPP Standard; Technical Specification; 3GPP TS 38.300, 3rd Generation Partnership Project (3GPP), Mobile Competence Centre; 650, Route Des Lucioles; F-06921 Sophia-Antipolis Cedex; France, vol. RAN WG2, No. V16.3.0, Oct. 2, 2020, pp. 1-148, XP051961311.

* cited by examiner

METHOD AND APPARATUS FOR CONFIGURING SIDELINK DISCONTINUOUS RECEPTION IN A WIRELESS COMMUNICATION SYSTEM

CROSS-REFERENCE TO RELATED APPLICATIONS

The present application claims the benefit of U.S. Provisional Patent Application Ser. No. 63/123,976 filed on Dec. 10, 2020, U.S. Provisional Patent Application Ser. No. 63/165,997 filed on Mar. 25, 2021, and U.S. Provisional Patent Application Ser. No. 63/175,208 filed on Apr. 15, 2021, the entire disclosures of which are incorporated herein in its entirety by reference.

FIELD

This disclosure generally relates to wireless communication networks, and more particularly, to a method and apparatus for configuring sidelink discontinuous reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for a User Equipment (UE) to sidelink discontinuous reception (DRX) for sidelink groupcast communication associated with a group. In one embodiment, the method includes the UE assuming or considering a sidelink DRX configuration applied for the sidelink groupcast communication associated with the group, wherein the sidelink DRX configuration comprises at least one of an on-duration timer length used for determining an on-duration at the beginning of each sidelink DRX cycle and/or a cycle length used for determining a length of each sidelink DRX cycle. The method also includes the UE deriving or determining a time to start of on-duration for each sidelink DRX cycle or start of each sidelink DRX cycle based on at least an identifier associated with the group. The method further includes the UE transmitting a sidelink control information associated with the group on a sidelink control channel in a period, wherein the period is determined based on the SL DRX configuration and the time to start of on-duration for each sidelink DRX cycle or start of each sidelink DRX cycle.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: RP-193231, "New WID on NR sidelink enhancement", LG Electronics; TS 38.300 V16.3.0, "NR; NR and NG-RAN Overall Description; Stage 2 (Release 16)"; TS 38.321 V16.2.1, "NR Medium Access Control (MAC) protocol specification (Release 16)"; TS 38.331 V16.2.0, "NR; Radio Resource Control (RRC) protocol specification (Release 16)"; TS 23.287 V16.4.0, "Architecture enhancements for 5G System (5GS) to support Vehicle-to-Everything (V2X) services (Release 16)"; TR 23.776 V1.0.0, "Study on architecture enhancements for 3GPP support of advanced Vehicle-to-Everything (V2X) services; Phase 2 (Release 17)"; and TR 23.776 V2.0.0, "Study on architecture enhancements for 3GPP support of advanced Vehicle-to-Everything (V2X) services; Phase 2 (Release 17)". The standards and documents listed above are hereby expressly incorporated by reference in their entirety.

Figure 1:
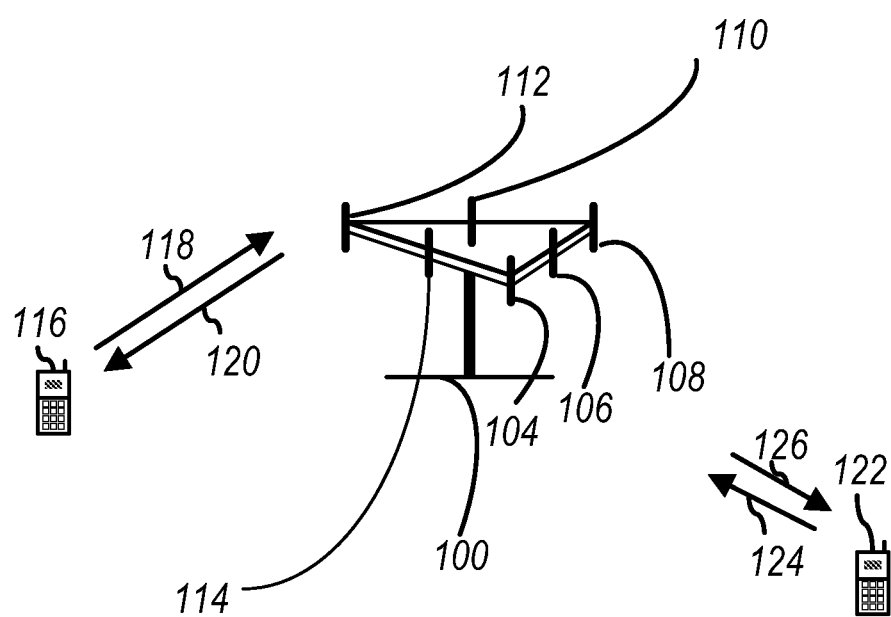
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
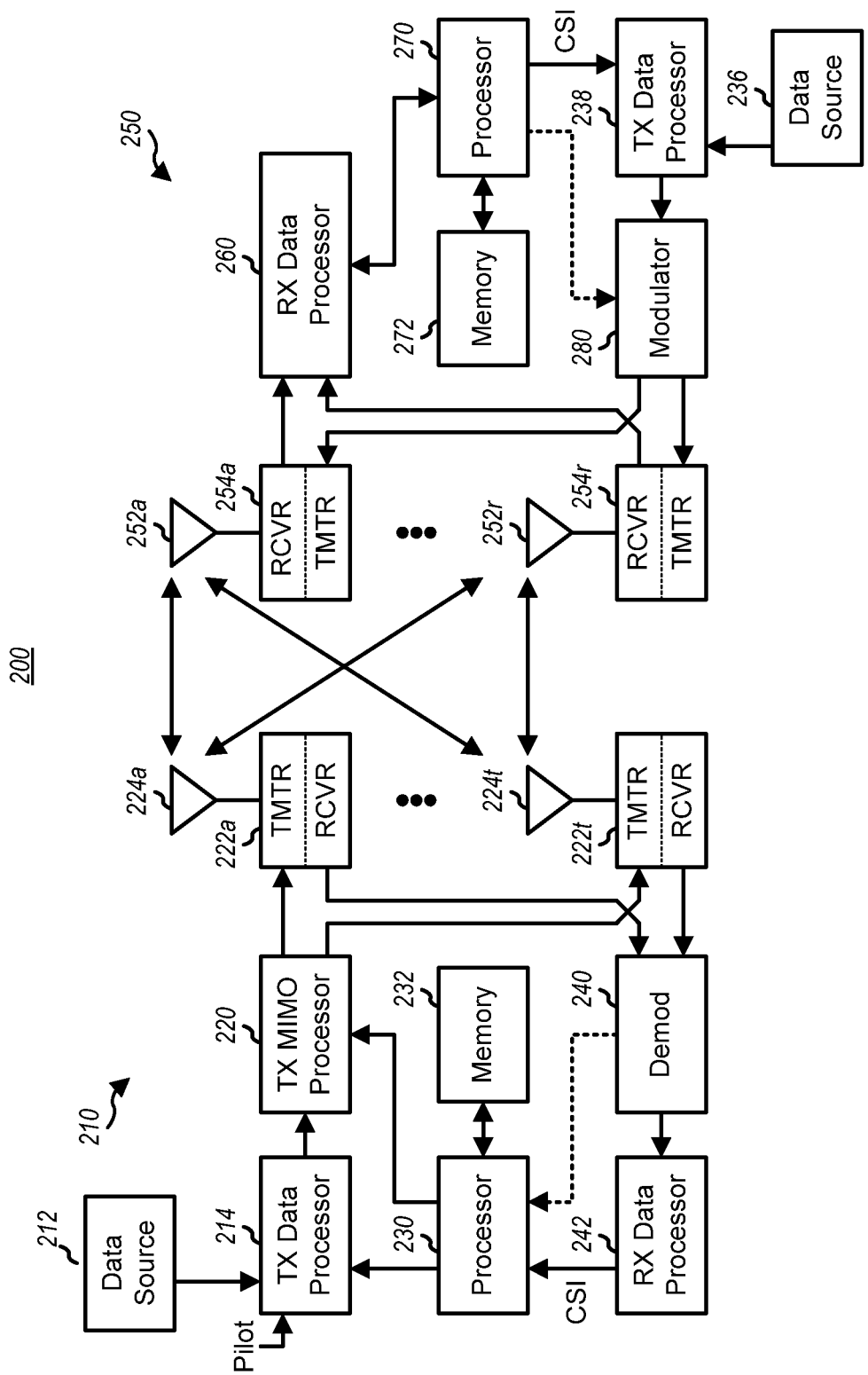
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
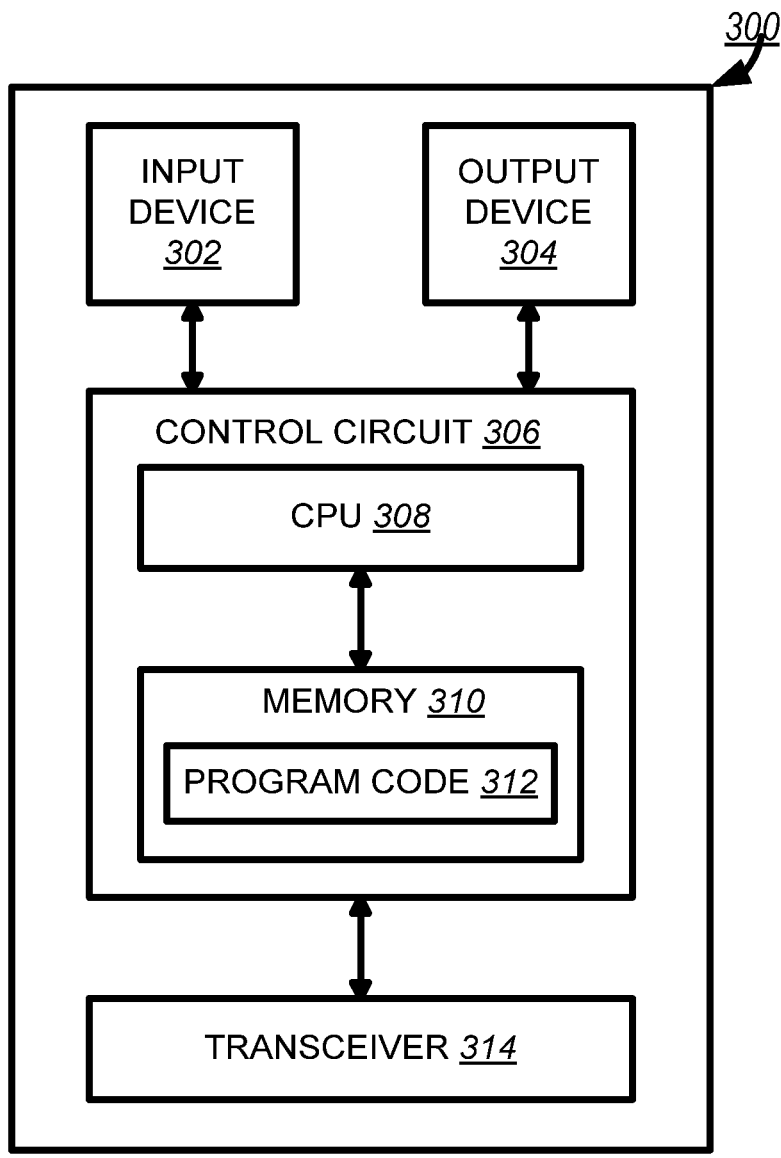
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
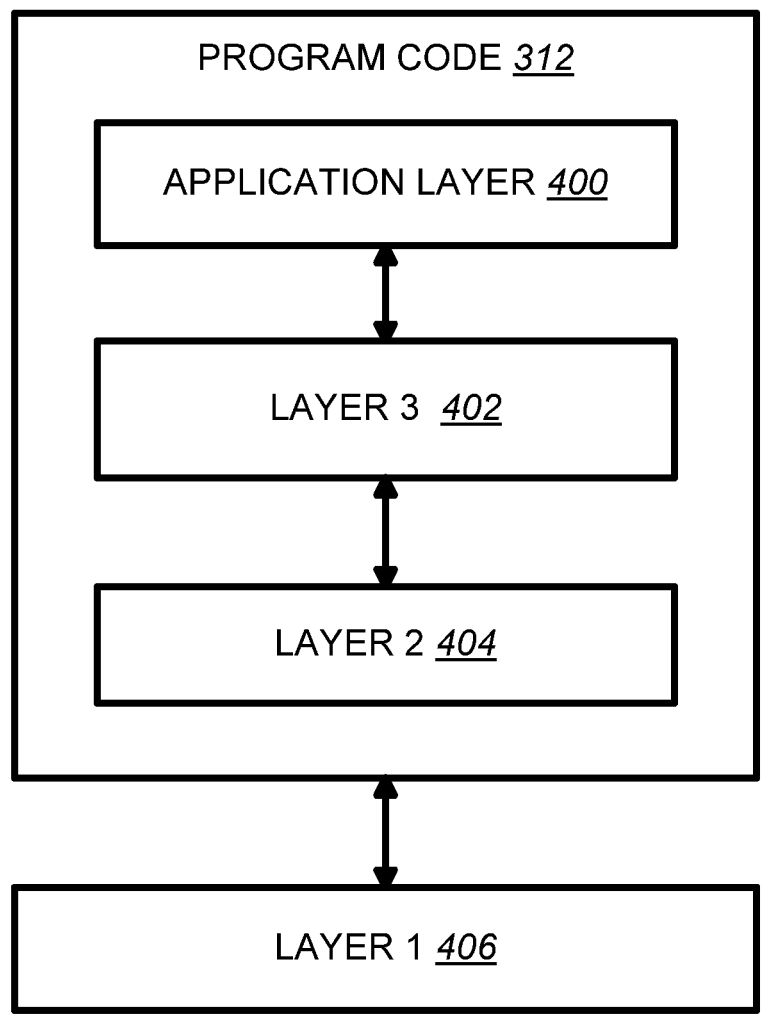
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP RP-193231 introduced the following:

3 Justification

3GPP has been developing standards for sidelink as a tool for UE to UE direct communication required in various use cases since LTE. The first standard for NR sidelink is to be completed in Rel-16 by the work item "5G V2X with NR sidelink" where solutions including NR sidelink are being specified mainly for vehicle-to-everything (V2X) while they can also be used for public safety when the service requirement can be met.

Meanwhile, the necessity of NR sidelink enhancement has been identified. For V2X and public safety, the service requirements and operation scenarios are not fully supported in Rel-16 due to the time limitation, and SA works are ongoing on some enhancement in Rel-17 such as architecture enhancements for 3GPP support of advanced V2X services—Phase 2 (FS_eV2XARC_Ph2) and System enhancement for Proximity based Services in 5GS (FS_5G_ProSe). In addition, other commercial use cases related to NR sidelink are being considered in SA WGs via several work/study items such as Network Controlled Interactive Service (NCIS), Gap Analysis for Railways (MONASTERYEND), Enhanced Relays for Energy eFficiency and Extensive Coverage (REFEC), Audio-Visual Service Production (AVPROD). In order to provide a wider coverage of NR sidelink for these use cases and be able to provide the radio solutions in accordance with the progress in SA WGs, it is necessary to specify enhancements to NR sidelink in TSG RAN.

TSG RAN started discussions in RAN#84 to identify the detailed motivations and work areas for NR sidelink enhancements in Rel-17. Based on the latest summary in RP-192745, significant interest has been observed for the several motivations including the following:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

While several work areas have been identified in the discussion, some important principles were also discussed regarding the 3GPP evolution for NR sidelink. In dealing with different use cases in the evolution of NR sidelink, WGs should strive to achieve maximum commonality between commercial, V2X, and Critical Communication usage of sidelink in order to avoid duplicated solutions and maximize the economy of scale. In addition, enhancements introduced in Rel-17 should be based on the functionalities specified in Rel-16, instead of designing the fundamental NR sidelink functionality again in Rel-17.

4 Objective 4.1 Objective of SI or Core Part WI or Testing Part WI

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN#88) [RAN1]

Note: TR 37.885 is reused for the other evaluation assumption and performance metric. Vehicle dropping model B and antenna option 2 shall be a more realistic baseline for highway and urban grid scenarios.

2. Resource allocation enhancement:

Specify resource allocation to reduce power consumption of the UEs [RAN1, RAN2]

Baseline is to introduce the principle of Rel-14 LTE sidelink random resource selection and partial sensing to Rel-16 NR sidelink resource allocation mode 2.

Note: Taking Rel-14 as the baseline does not preclude introducing a new solution to reduce power consumption for the cases where the baseline cannot work properly.

Study the feasibility and benefit of the enhancement(s) in mode 2 for enhanced reliability and reduced latency in consideration of both PRR and PIR defined in TR37.885 (by RAN#89), and specify the identified solution if deemed feasible and beneficial [RAN1, RAN2]

Inter-UE coordination with the following until RAN#88.

A set of resources is determined at UE-A. This set is sent to UE-B in mode 2, and UE-B takes this into account in the resource selection for its own transmission.

Note: The study scope after RAN#88 is to be decided in RAN#88.

Note: The solution should be able to operate in-coverage, partial coverage, and out-of-coverage and to address consecutive packet loss in all coverage scenarios.

Note: RAN2 work will start after RAN#89.

3. Sidelink DRX for broadcast, groupcast, and unicast [RAN2]

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE 4. Support of new sidelink frequency bands for single-carrier operations [RAN4]

Support of new sidelink frequency bands should ensure coexistence between sidelink and Uu interface in the same and adjacent channels in licensed spectrum.

The exact frequency bands are to be determined based on company input during the WI, considering both licensed and ITS-dedicated spectrum in both FR1 and FR2.

5. Define mechanism to ensure sidelink operation can be confined to a predetermined geographic area(s) for a given frequency range within non-ITS bands [RAN2].

This applies areas where there is no network coverage.

6. UE Tx and Rx RF requirement for the new features introduced in this WI [RAN4]

7. UE RRM core requirement for the new features introduced in this WI [RAN4]

Enhancements introduced in Rel-17 should be based on the functionalities specified in Rel-16, and Rel-17 sidelink should be able to coexist with Rel-16 sidelink in the same resource pool. This does not preclude the possibility of operating Rel-17 sidelink in a dedicated resource pool. The solutions should cover both the operating scenario where the carrier(s) is/are dedicated to ITS and the operating scenario where the carrier(s) is/are licensed spectrum and also used for NR Uu/LTE Uu operation.

The solutions should support the network control of NR sidelink as in Rel-16, i.e., NR Uu controls NR sidelink using Layer 1 and Layer 2 signalling and LTE Uu controls NR sidelink using Layer 2 signalling.

In ITS carriers, it is assumed that any co-channel coexistence requirements and mechanisms of NR sidelink with non-3GPP technologies will not be defined by 3GPP.

3GPP TS 38.300 introduced the concept of discontinuous reception as follows:

11 UE Power Saving

The PDCCH monitoring activity of the UE in RRC connected mode is governed by DRX, BA, and DCP.

When DRX is configured, the UE does not have to continuously monitor PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity (see FIG. 11-1 below);

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Figure 5:
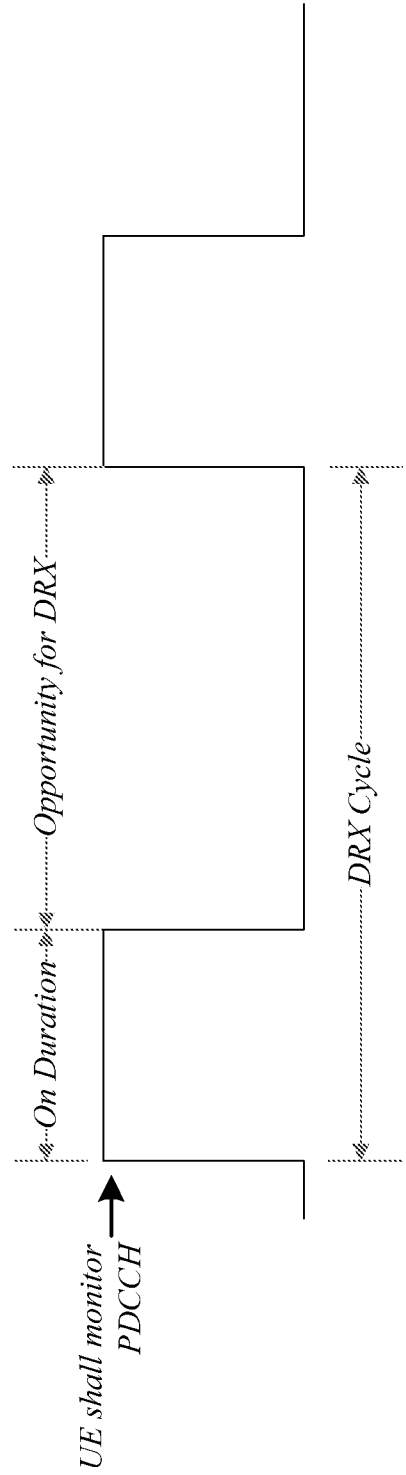
FIG. 5 is a reproduction of FIG. 11-1 of 3GPP TS 38.300 V16.3.0.
Figure 11:
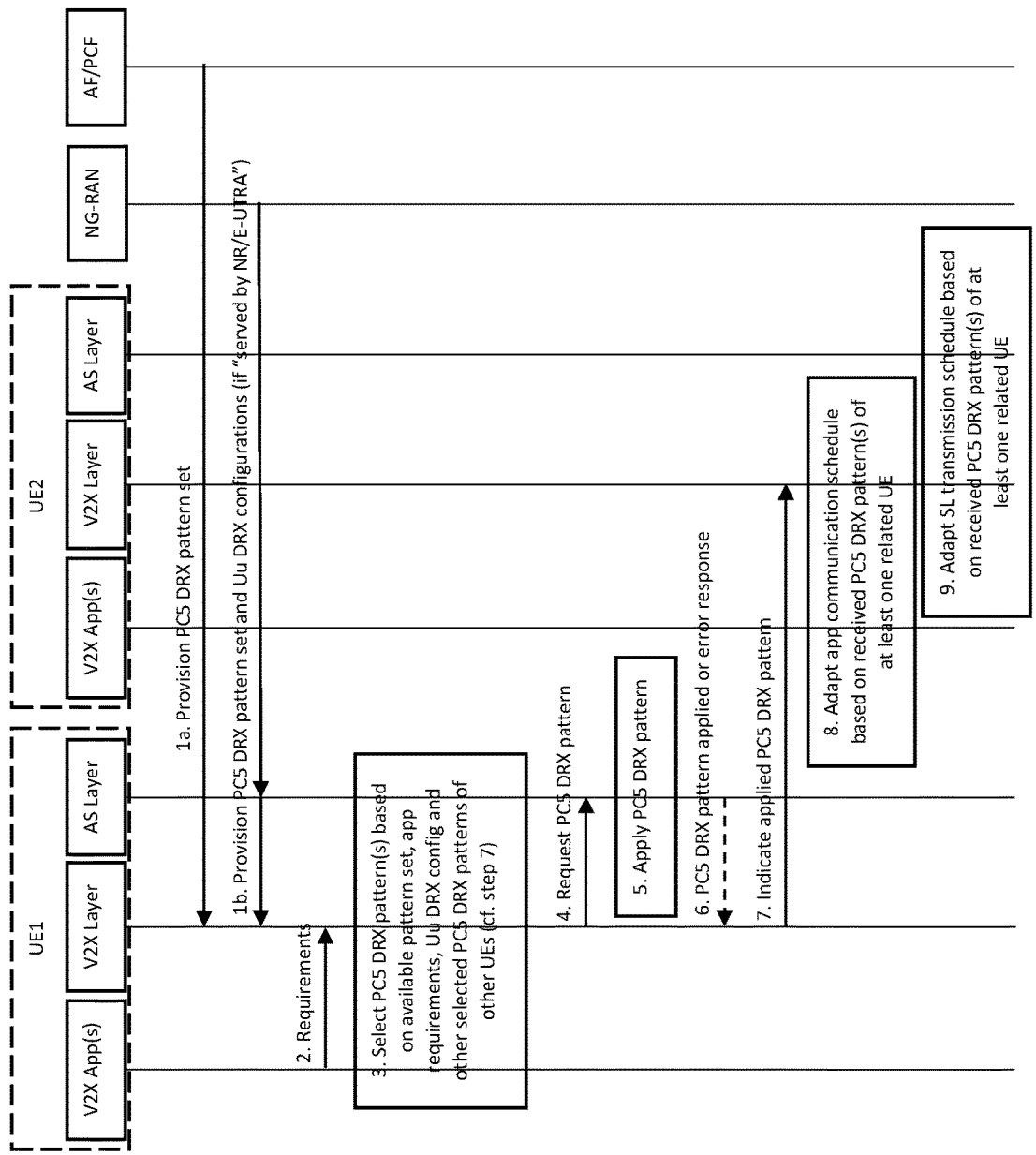
FIG. 11 is a reproduction of FIG. 6.2.2-1 of 3GPP TS 23.776 V1.0.0.

[FIG. 11-1 of 3GPP TS 38.300 V16.3.0, Entitled "DRX Cycle", is Reproduce as FIG. 5]

3GPP TS 38.321 specified operation of discontinuous reception as follows:

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL. When a DRX cycle is configured, the Active Time for Serving Cells in a DRX group includes the time while:

drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer (as described in clause 5.1.5) or msgB-Response Window (as described in clause 5.1.4a) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.

1> if a MAC PDU is transmitted in a configured uplink grant and LBT failure indication is not received from lower layers:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.

1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.

1> if a drx-HARQ-RTT-TimerUL expires:
  2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:
  2> stop drx-onDurationTimer for each DRX group;
  2> stop drx-InactivityTimer for each DRX group.

1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.

1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2> else:
    3> use the Long DRX cycle for each DRX group.

1> if drx-ShortCycleTimer for a DRX group expires:
  2> use the Long DRX cycle for this DRX group.

1> if a Long DRX Command MAC CE is received:
  2> stop drx-ShortCycleTimer for each DRX group;
  2> use the Long DRX cycle for each DRX group.

1> if the Short DRX cycle is used for a DRX group, and [(SFN×10)+subframe number] modulo (drx-ShortCycle)=(drx-StartOffset) modulo (drx-ShortCycle):
  2> start drx-onDurationTimer for this DRX group after drx-SlotOffset from the beginning of the subframe.

1> if the Long DRX cycle is used for a DRX group, and [(SFN×10)+subframe number] modulo (drx-LongCycle)=drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
   3> if ps-Wakeup is configured with value true and DCP indication associated with the current DRX cycle has not been received from lower layers:
      4> start drx-onDurationTimer after drx-SlotOffset from the beginning of the subframe.
2> else:
   3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.

1> if a DRX group is in Active Time:
   2> monitor the PDCCH on the Serving Cells in this DRX group as specified in TS 38.213 [6];
   2> if the PDCCH indicates a DL transmission:
      3> start the drx-HARQ-RTT-TimerDL for the corresponding HARQ process in the first symbol after the end of the corresponding transmission carrying the DL HARQ feedback;

NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.

3> stop the drx-RetransmissionTimerDL for the corresponding HARQ process.
      3> if the PDSCH-to-HARQ_feedback timing indicate a non-numerical k1 value as specified in TS 38.213 [6]:
         4> start the drx-RetransmissionTimerDL in the first symbol after the PDSCH transmission for the corresponding HARQ process.
   2> if the PDCCH indicates a UL transmission:
      3> start the drx-HARQ-RTT-TimerUL for the corresponding HARQ process in the first symbol after the end of the first repetition of the corresponding PUSCH transmission;
      3> stop the drx-RetransmissionTimerUL for the corresponding HARQ process.
   2> if the PDCCH indicates a new transmission (DL or UL) on a Serving Cell in this DRX group:
      3> start or restart drx-InactivityTimer for this DRX group in the first symbol after the end of the PDCCH reception.
   2> if a HARQ process receives downlink feedback information and acknowledgement is indicated:
      3> stop the drx-RetransmissionTimerUL for the corresponding HARQ process.

1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
   2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
      3> not transmit periodic SRS and semi-persistent SRS defined in TS 38.214 [7];
      3> not report semi-persistent CSI configured on PUSCH;
      3> if ps-TransmitPeriodicL1-RSRP is not configured with value true:
         4> not report periodic CSI that is L1-RSRP on PUCCH.
      3> if ps-TransmitOtherPeriodicCSI is not configured with value true:
         4> not report periodic CSI that is not L1-RSRP on PUCCH.
1> else:
   2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
      3> not transmit periodic SRS and semi-persistent SRS defined in TS 38.214 [7] in this DRX group;
      3> not report CSI on PUCCH and semi-persistent CSI configured on PUSCH in this DRX group.
   2> if CSI masking (csi-Mask) is setup by upper layers:
      3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
         4> not report CSI on PUCCH in this DRX group.

NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected. The MAC entity needs not to monitor the PDCCH if it is not a complete PDCCH occasion (e.g. the Active Time starts or ends in the middle of a PDCCH occasion).

Figure 6:
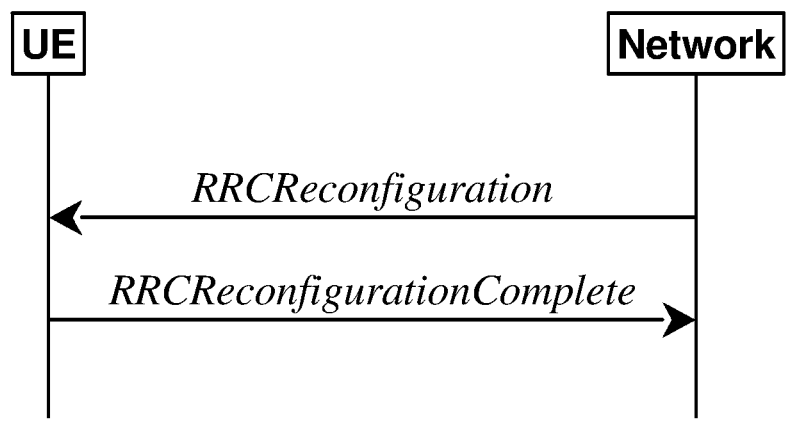
FIG. 6 is a reproduction of FIG. 5.3.5.1-1 of 3GPP TS 38.331 V16.2.0.

3GPP TS 38.331 specified configuration of discontinuous reception as follows:

5.3.5 RRC Reconfiguration
5.3.5.1 General
[FIG. 5.3.5.1-1 of 3GPP TS 38.331 V16.2.0, Entitled "RRC Reconfiguration, Successful", is Reproduced as FIG. 6]
[ . . . ]

The purpose of this procedure is to modify an RRC connection, e.g. to establish/modify/release RBs, to perform reconfiguration with sync, to setup/modify/release measurements, to add/modify/release SCells and cell groups. As part of the procedure, NAS dedicated information may be transferred from the Network to the UE.

[ . . . ]

5.8.5 Sidelink Synchronisation Information Transmission for NR Sidelink Communication 5.8.5.1 General

Figure 7:
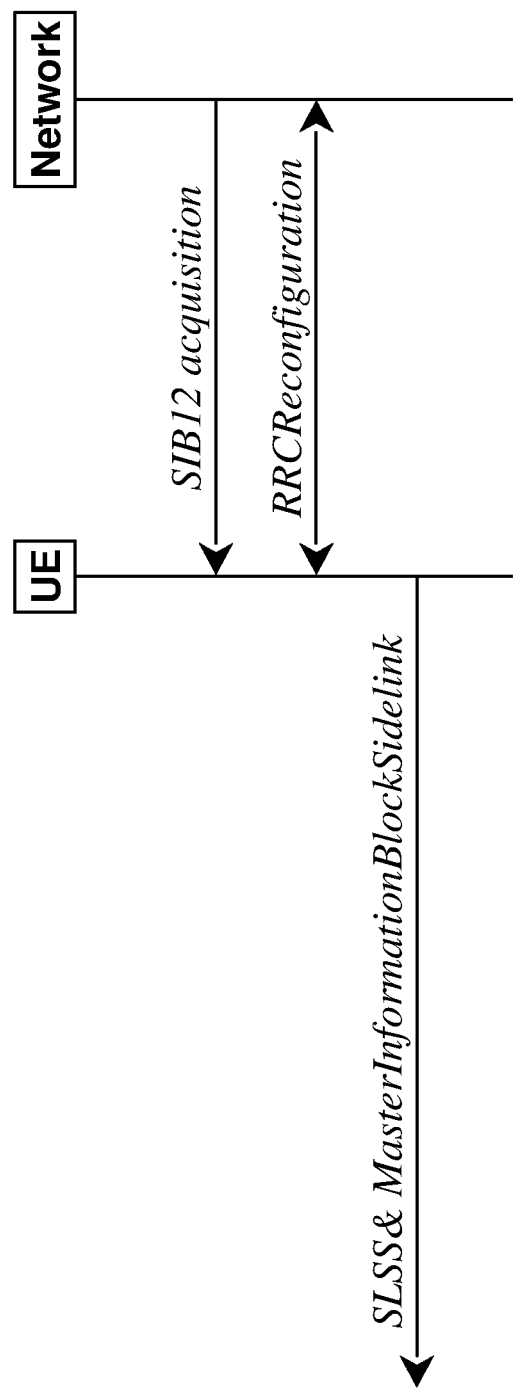
FIG. 7 is a reproduction of FIG. 5.8.5.1-1 of 3GPP TS 38.331 V16.2.0.

[FIG. 5.8.5.1-1 of 3GPP TS 38.331 V16.2.0, Entitled "Synchronisation Information Transmission for NR Sidelink Communication, in (Partial) Coverage", is Reproduced as FIG. 7]

Figure 8:
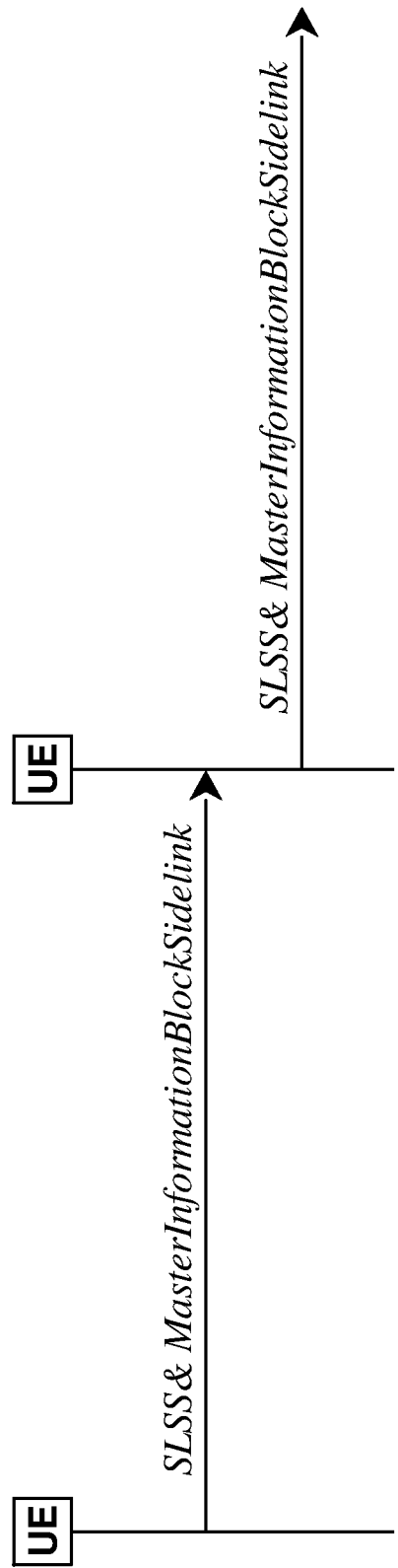
FIG. 8 is a reproduction of FIG. 5.8.5.1-2 of 3GPP TS 38.331 V16.2.0.

[FIG. 5.8.5.1-2 of 3GPP TS 38.331 V16.2.0, Entitled "Synchronisation Information Transmission for NR Sidelink Communication, Out of Coverage", is Reproduced as FIG. 8]

The purpose of this procedure is to provide synchronisation information to a UE.

[ . . . ]

5.8.9 Sidelink RRC Procedure 5.8.9.1 Sidelink RRC Reconfiguration 5.8.9.1.1 General

Figure 9:
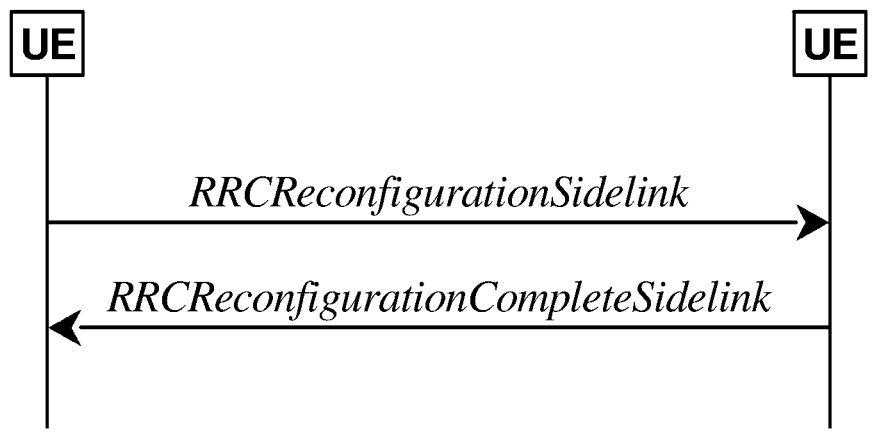
FIG. 9 is a reproduction of FIG. 5.8.9.1.1-1 of 3GPP TS 38.331 V16.2.0.

[FIG. 5.8.9.1.1-1 of 3GPP TS 38.331 V16.2.0, Entitled "Sidelink RRC Reconfiguration, Successful", is Reproduced as FIG. 9]

[ . . . ]

The purpose of this procedure is to modify a PC5-RRC connection, e.g. to establish/modify/release sidelink DRBs, to configure NR sidelink measurement and reporting, to configure sidelink CSI reference signal resources and CSI reporting latency bound. The UE may initiate the sidelink RRC reconfiguration procedure and perform the operation in sub-clause 5.8.9.1.2 on the corresponding PC5-RRC connection in following cases:

the release of sidelink DRBs associated with the peer UE, as specified in sub-clause 5.8.9.1a.1;

the establishment of sidelink DRBs associated with the peer UE, as specified in sub-clause 5.8.9.1a.2;

the modification for the parameters included in SLRB-Config of sidelink DRBs associated with the peer UE, as specified in sub-clause 5.8.9.1a.2;

the configuration of the peer UE to perform NR sidelink measurement and report.

the configuration of the sidelink CSI reference signal resources and CSI reporting latency bound.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

[ . . . ]

6.3.2 Radio Resource Control Information Elements

[ . . . ]

DRX-Config

The IE DRX-Config is used to configure DRX related parameters.

| DRX-Config information element |
| --- |

```
-- ASN1START
-- TAG-DRX-CONFIG-START
DRX-Config ::=                    SEQUENCE {
    drx-onDurationTimer               CHOICE {
                                          subMilliSeconds INTEGER (1..31),
                                          milliseconds    ENUMERATED {
                                              ms1, ms2, ms3, ms4, ms5, ms6, ms8, ms10, ms20,
ms30, ms40, ms50, ms60,
                                              ms80, ms100, ms200, ms300, ms400, ms500, ms600,
ms800, ms1000, ms1200,
                                              ms1600, spare8, spare7, spare6, spare5, spare4,
spare3, spare2, spare1 }
                                          },
    drx-InactivityTimer               ENUMERATED {
                                          ms0, ms1, ms2, ms3, ms4, ms5, ms6, ms8, ms10, ms20,
ms30, ms40, ms50, ms60, ms80,
                                          ms100, ms200, ms300, ms500, ms750, ms1280, ms1920,
ms2560, spare9, spare8,
                                          spare7, spare6, spare5, spare4, spare3, spare2,
spare1},
    drx-HARQ-RTT-TimerDL              INTEGER (0..56),
    drx-HARQ-RTT-TimerUL              INTEGER (0..56),
    drx-RetransmissionTimerDL         ENUMERATED {
                                          sl0, sl1, sl2, sl4, sl6, sl8, sl16, sl24, sl33, sl40
sl64, sl80, sl96, sl112, sl128,
                                          sl160, sl320, spare15, spare14, spare13, spare12,
spare11, spare10, spare9,
                                          spare8, spare7, spare6, spare5, spare4, spare3,
spare2, spare1},
    drx-RetransmissionTimerUL         ENUMERATED {
                                          sl0, sl1, sl2, sl4, sl6, sl8, sl16, sl24, sl33, sl40
sl64, sl80, sl96, sl112, sl128,
                                          sl160, sl320, spare15, spare14, spare13, spare12,
spare11, spare10, spare9,
                                          spare8, spare7, spare6, spare5, spare4, spare3,
spare2, spare1 },
    drx-LongCycleStartOffset          CHOICE {
        ms10                              INTEGER(0..9),
        ms20                              INTEGER(0..19),
        ms32                              INTEGER(0..31),
        ms40                              INTEGER(0..39),
```

-continued

| DRX-Config information element | |
|---|---|
| ms60 | INTEGER(0..59), |
| ms64 | INTEGER(0..63), |
| ms70 | INTEGER(0..69), |
| ms80 | INTEGER(0..79), |
| ms128 | INTEGER(0..127), |
| ms160 | INTEGER(0..159), |
| ms256 | INTEGER(0..255), |
| ms320 | INTEGER(0..319), |
| ms512 | INTEGER(0..511), |
| ms640 | INTEGER(0..639), |
| ms1024 | INTEGER(0..1023), |
| ms1280 | INTEGER(0..1279), |
| ms2048 | INTEGER(0..2047), |
| ms2560 | INTEGER(0..2559), |
| ms5120 | INTEGER(0..5119), |
| ms10240 | INTEGER(0..10239) |

```
    },
    shortDRX            SEQUENCE {
      drx-ShortCycle      ENUMERATED {
                            ms2, ms3, ms4, ms5, ms6, ms7, ms8, ms10, ms14,
ms16, ms20, ms30, ms32,
                            ms35, ms40, ms64, ms80, ms128, ms160, ms256,
ms320, ms512, ms640, spare9,
                            spare8, spare7, spare6, spare5, spare4, spare3,
spare2, spare1 },
      drx-ShortCycleTimer INTEGER (1..16)
    }
OPTIONAL,   -- Need R
    drx-SlotOffset      INTEGER (0..31)
}
-- TAG-DRX-CONFIG-STOP
-- ASN1STOP
```

| DRX-Config field descriptions |
|---|
| drx-HARQ-RTT-TimerDL |
| Value in number of symbols of the BWP where the transport block was received. |
| drx-HARQ-RTT-TimerUL |
| Value in number of symbols of the BWP where the transport block was transmitted. |
| drx-InactivityTimer |
| Value in multiple integers of 1 ms. ms0 corresponds to 0, ms1 corresponds to 1 ms, ms2 corresponds to 2 ms, and so on. |
| drx-LongCycleStartOffset |
| drx-LongCycle in ms and drx-StartOffset in multiples of 1 ms. If drx-ShortCycle is configured, the value of drx-LongCycle shall be a multiple of the drx-ShortCycle value. |
| drx-onDurationTimer |
| Value in multiples of $1/32$ ms (subMilliSeconds) or in ms (milliSecond). For the latter, value ms1 corresponds to 1 ms, value ms2 corresponds to 2 ms, and so on. |
| drx-RetransmissionTimerDL |
| Value in number of slot lengths of the BWP where the transport block was received, value sl0 corresponds to 0 slots, sl1 corresponds to 1 slot, sl2 corresponds to 2 slots, and so on. |
| drx-RetransmissionTimerUL |
| Value in number of slot lengths of the BWP where the transport block was transmitted. sl0 corresponds to 0 slots, sl1 corresponds to 1 slot, sl2 corresponds to 2 slots, and so on. |
| drx-ShortCycleTimer |
| Value in multiples of drx-ShortCycle. A value of 1 corresponds to drx-ShortCycle, a value of 2 corresponds to 2 * drx-ShortCycle and so on. |
| drx-ShortCycle |
| Value in ms. ms1 corresponds to 1 ms, ms2 corresponds to 2 ms, and so on. |
| drx-SlotOffset |
| Value in $1/32$ ms. Value 0 corresponds to 0 ms, value 1 corresponds to $1/32$ ms, value 2 corresponds to $2/32$ ms, and so on. |
| [ . . . ] |

3GPP TS 23.287 introduced the following:

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 10:
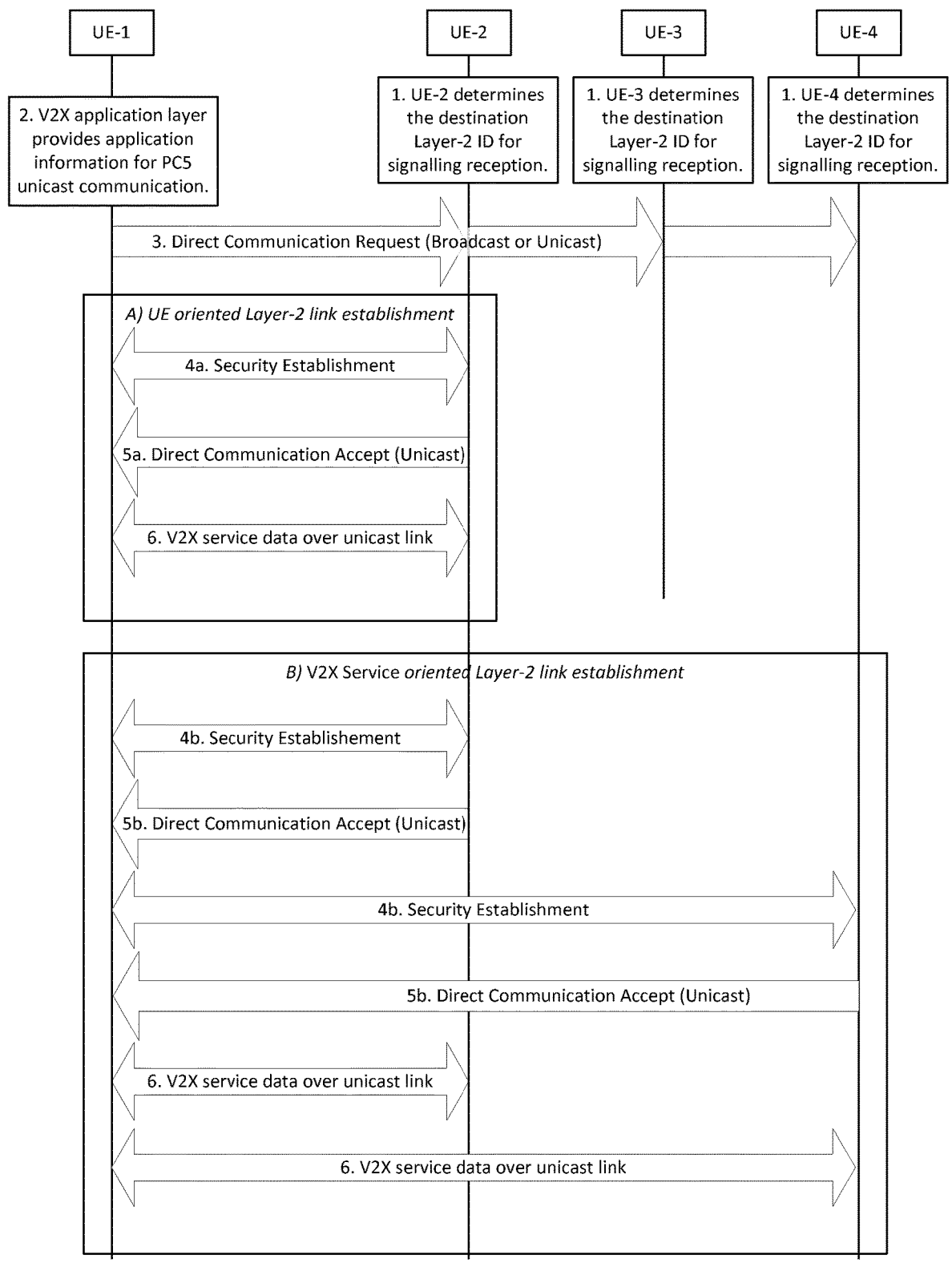
FIG. 10 is a reproduction of FIG. 6.3.3.1-1 of 3GPP TS 23.287 V16.4.0.

[FIG. 6.3.3.1-1 of 3GPP TS 23.287 V16.4.0, Entitled "Layer-2 Link Establishment Procedure", is Reproduced as FIG. 10]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X service type(s) requesting Layer-2 link establishment.

Security Information: the information for the establishment of security.

NOTE 1: The Security Information and the necessary protection of the Source User Info and Target User Info are defined in TS 33.536 [26].

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X service type(s) over a PC5 unicast link with UE-1 responds by establishing the security with UE-1.

NOTE 2: The signalling for the Security Procedure is defined in TS 33.536 [26].

When the security protection is enabled, UE-1 sends the following information to the target UE:

If IP communication is used:

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and the associated V2X service type(s).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and the associated V2X service type(s).

If IP communication is used:
  IP Address Configuration: For IP communication, IP address configuration is required for this link and indicates one of the following values: "IPv6 Router" if IPv6 address allocation mechanism is supported by the target UE, i.e., acting as an IPv6 Router; or "IPv6 address allocation not supported" if IPv6 address allocation mechanism is not supported by the target UE.
  Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.
  If both UEs (i.e. the initiating UE and the target UE) selected to use link-local IPv6 address, they shall disable the duplicate address detection defined in RFC 4862 [21].
  NOTE 3: When either the initiating UE or the target UE indicates the support of IPv6 router, corresponding address configuration procedure would be carried out after the establishment of the layer 2 link, and the link-local IPv6 addresses are ignored.
  The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID) and the corresponding PC5 QoS parameters. This enables the AS layer to maintain the PC5 Link Identifier together with the PC5 unicast link related information.
6. V2X service data is transmitted over the established unicast link as below:
  The PC5 Link Identifier, and PFI are provided to the AS layer, together with the V2X service data.
  Optionally in addition, the Layer-2 ID information (i.e. source Layer-2 ID and destination Layer-2 ID) is provided to the AS layer.
  NOTE 4: It is up to UE implementation to provide the Layer-2 ID information to the AS layer. UE-1 sends the V2X service data using the source Layer-2 ID (i.e. UE-1's Layer-2 ID for this unicast link) and the destination Layer-2 ID (i.e. the peer UE's Layer-2 ID for this unicast link).
  NOTE 5: PC5 unicast link is bi-directional, therefore the peer UE of UE-1 can send the V2X service data to UE-1 over the unicast link with UE-1.
3GPP TR 23.776 V1.0.0 introduced the following:
6.2 Solution #2: PC5 DRX Configuration for QoS-Aware and Power-Efficient Communication of Pedestrian UEs
6.2.1 Functional Description
This solution is for "Key Issue #1: Support of QoS aware NR PC5 power efficiency for pedestrian UEs".
In road safety as well as public safety use cases, Pedestrian UEs are often involved in PC5 groupcast or broadcast communication in connectionless manner. One pedestrian UE may need to listen to various PC5 Tx UEs in proximity without knowing about Tx UEs in advance. Thus, possible DRX operation for PC5 Rx UE needs to cope with various and random Tx UEs present in proximity. PC5 Tx UE, on the other hand, may not know or care about presence of any particular Rx UE in proximity. This makes PC5 DRX operation specific to each pair of PC5 Tx UE and Rx UE rather impractical, especially for PC5 groupcast and broadcast.

In connection-oriented PC5 unicast case, DRX operation specific to a pair of Tx UE and Rx UE over PC5 may be agreed beforehand between Rx UE and Tx UE. However, if the PC5 unicast Tx UE or Rx UE has other PC5 unicast/groupcast/broadcast communication services with the same or different peer UEs in addition to the PC5 unicast in question, uncoordinated PC5 DRX configuration for each PC5 unicast communication may lead to mis-aligned PC5 DRX patterns. This makes PC5 DRX overall less effective in terms of power saving.

To coordinate PC5 DRX configurations not only between the peered PC5 Tx UE and Rx UEs for one SL application/service but also among a number of PC5 UEs involved in multiple PC5 communications in proximity, this solution is based on having a common set of PC5 DRX patterns configured in PC5 UEs by the serving network for in-coverage operation or pre-configured for out-of-coverage operation. A PC5 DRX pattern includes information about the ON/OFF periods that shall be used in the (AS-layer) PC5 DRX schedule and each PC5 DRX pattern may be associated with one or more V2X service types. Note that there may be PC5 DRX patterns that would rather fit combinations of service types. Thus, the (pre-)configured set of PC5 DRX patterns may be corresponding to supported combinations of different use cases, service profiles, status or classes of PC5 UEs. The (pre-)configured set of PC5 DRX patterns can be also in line with resource pool configurations, because the patterns can be known to the AS layer when the resource pools are configured (or the other way round), so that the V2X layer does not need to deal with or understand resource pool configurations. However, the resource pool configuration does not need to be performed in a way that guarantees dedicated radio resources for specific V2X service types.

The contents of the PC5 DRX pattern set (e.g., length and period of ON/OFF cycles) may take into account QoS requirements of the V2X service type(s), e.g. the default PC5 QoS parameters that are configured in the UEs for each V2X service type, as described in TS 23.287 [5] clause 5.4.2.5. The fact that the QoS for a certain V2X service may be different on different UEs can be compensated by the PC5 DRX schedule selection and enforcement procedure that takes place on the UE (see clause 6.2.2).

In this way, the extensive coordination between relevant PC5 UEs in proximity to determine and agree on the PC5 DRX patterns can be avoided. The relevant PC5 UEs only needs to select one or more PC5 DRX pattern(s) from the limited set of configured PC5 DRX patterns and adapt SL transmissions and receptions to the selected pattern(s) of their own and other PC5 UEs in proximity.

The PC5 DRX mode shall be activated only if a PC5 DRX pattern that fits the V2X services running on the UE is found. Further, the V2X layer may enable the application layer to request the deactivation of the PC5 DRX mode. When and why a V2X application may request the deactivation of the PC5 DRX mode is up to the implementation of the V2X application and out of scope for the V2X layer.

NOTE: The solution applies to the management of a single AS-layer DRX schedule on a UE, which is applied for all communication modes and all V2X services. In case a UE can have multiple different DRX schedules active at the same time (e.g., for broadcast and unicast), then the entire procedure is applicable separately and independently for each DRX schedule, i.e., there are different pattern sets for each schedule etc. Since the DRX mode is targeted to receiving P-UEs, the transmission schedules of transmitting UEs may need to be aligned with the DRX schedules of receiving UEs.

Editor's note: The question of having a single or two separate DRX schedules for Uu and PC5, as well as any alignment between them (if needed), is still open also in RAN WG.

6.2.2 Procedures

FIG. 6.2.2-1 illustrates an example operation of the solution for power efficient PC5 communication for Pedestrian UEs based on pre-defined PC5 DRX patterns.

[FIG. 6.2.2-1 of 3GPP TS 23.776 V1.0.0, Entitled "PC5 DRX Configuration Procedure for QoS-Aware and Power-Efficient Communication of Pedestrian UEs", is Reproduced as FIG. 11]

1a. UEs are (pre-)configured with the PC5 DRX related parameters including a set of applicable PC5 DRX patterns from which UEs can select. The PC5 DRX configuration can be either provided by the PCF (or by the AF via NEF/PCF) using the procedure specified in TS 23.287 [5] clause 6.2, or pre-configured as specified in TS 23.287 [5] clause 5.1.1.

1b. If the UE is "served by NR" (as defined in TS 23.287 [5]), the PC5 DRX configuration may be alternatively provided by the NG-RAN, potentially together with information about Uu configurations, either via broadcasting or with dedicated RRC signalling. In this option, the AS layer may indicate the relevant configured PC5 DRX parameters to the V2X layer or apply PC5 DRX configuration on the AS layer (see also the description of step 5).

Editor's note: Whether and how the NG-RAN provides the PC5 DRX configuration to the UE is up to RAN WGs to decide.

2. The V2X application layer provides the Application Requirements to the V2X layer which can be mapped to QoS parameters as defined in TS 23.287 [5] clause 5.4.1.1. V2X applications layer may also provide application traffic pattern information, which contains message periodicity/interval and message size/burst information if available.

NOTE 1: The mentioned application traffic pattern information may also be provided by the V2X applications (via the V2X layer) to the AS layer, where they can be used as input when computing the AS-layer SL-TrafficPatternInfo (defined in TS 38.331 [9]), which could in turn have an impact on AS layer's final decision about the PC5 DRX configuration that is to be applied. The AS layer SL-TrafficPatternInfo contains more RAN related parameters in addition to message periodicity and message size.

Editor's note: Whether and when it is useful to provide the application traffic pattern information from the V2X layer to the AS layer need coordination with RAN WGs.

3. The V2X layer of UE1 may select one or more PC5 DRX pattern from the configured PC5 DRX pattern set. If more than one PC5 DRX patterns are selected, this means that the V2X layer can accept the application of any of them. The selection takes into account the following i) the requirements and application traffic pattern information of all active V2X service types that the UE1 currently has, ii) the Uu DRX configurations received by the NG-RAN (if any), and iii) the selected PC5 DRX patterns that other relevant UEs have applied and indicated.

NOTE 2: The triggering of the selection of the PC5 DRX pattern(s) at the V2X Layer, e.g. upon expiration of a timer, upon changes of the V2X Application Requirements as defined in TS 23.287 [5] or the DRX-related information about other UEs, or similar, is up to implementation. Potential PC5 DRX negotiations performed in the context of a single unicast connection are not considered by the V2X layer in this step, but rather during the AS-layer decision to accept a V2X layer-requested PC5 DRX pattern (step 5) or during the V2X-layer-independent decision of the AS-layer to modify an applied PC5 DRX schedule or apply a new one (see step 6).

4. The V2X layer of UE1 requests applying (one of) the selected PC5 DRX pattern(s) to the AS layer for control of PC5 transmission and reception according to the selected PC5 DRX pattern.

5. The AS layer of UE1 decides to apply or not the requested PC5 DRX pattern (or one of the requested PC5 DRX patterns), i.e., it configures the (AS-layer) PC5 DRX schedule based on the ON/OFF periods indicated in the PC5 DRX pattern.

NOTE 3: The selection and request of PC5 DRX patterns at the V2X layer is optional and the PC5 DRX schedule (and further related configuration) might be decided on the AS layer only, though ideally based on knowledge about V2X Application Requirements as defined in TS 23.287 [5] and traffic patterns. RAN WG will have a final confirmation on the criteria used in this case. In this case the AS layer may know the set of applicable PC5 DRX patterns (as well as all further inputs that it requires) and send indications about the applied PC5 DRX schedule to other UEs using mechanisms specified by the RAN WG. Further, again depending on RAN WG decisions, the AS layer of UE1 could potentially also decide to extend the ON durations of a selected (and applied) PC5 DRX schedule based on AS layer information (e.g., full buffers, misalignment with resource pools or AS-layer signalling, monitored QoS, etc.).

6. The AS layer informs the V2X layer about the success or failure of the application of the requested PC5 DRX pattern(s), indicating which pattern was applied if multiple were provided in the request. In case the AS layer decides to apply a PC5 DRX schedule that does not correspond to any of the provided patterns, then the applied PC5 DRX schedule is also indicated to the V2X layer. This indication can be provided not only as a response to a PC5 DRX pattern request (step 4) but also later (asynchronously) in case the AS layer modifies the PC5 DRX schedule (or applies a new one) based on its own logic.

7. The V2X layer of UE1 indicates (using broadcast or groupcast communication over the PC5 interface) the applied PC5 DRX pattern to other relevant UE(s) (e.g. UE2) to allow UE2 to select its PC5 DRX pattern in a coordinated manner.

8. The V2X applications of UE2 may retrieve from the V2X layer information about the PC5 DRX patterns applied by one or more related UEs and adjust their communication schedule.

9. The V2X layer of UE2 may provide the V2X layer information about the PC5 DRX patterns applied by one or more related UEs to the AS layer and the AS layer adapts the PC5 transmission schedule accordingly.

6.2.3 Impacts on Services, Entities and Interfaces

The solution has the following impacts to the existing entities:

AF:
Needs to perform the provisioning of PC5 DRX related configuration including the set of applicable PC5 DRX patterns (if V2X layer procedure is applied for PC5 DRX parameter configuration).

NEF:
Needs to expose an API that can receive the AF-provided configurations mentioned above (if V2X layer procedure is applied for PC5 DRX parameter configuration).

PCF:
Needs to support, handle, and V2X Policies that include the set of applicable PC5 DRX patterns (if V2X layer procedure is applied for PC5 DRX parameter configuration).

NG-RAN:
If AS layer procedure for PC5 DRX parameter configuration is to be supported, then the NG-RAN needs to support the signalling for PC5 (and Uu) DRX related configuration including the set of PC5 DRX patterns.

Editor's note: Whether AS layer procedure for PC5 DRX parameter configuration shall be supported is up to RAN WGs to decide.

UE:
the V2X layer of UE needs to be able to select a PC5 DRX pattern from a (pre-) configured set based on inputs included in V2X Policies.

the AS layer of UE needs to adapt its PC5 transmissions and receptions according to the selected PC5 DRX pattern.

being able to transmit and receive an applied PC5 DRX configuration to/from other UEs using unicast, broadcast or groupcast.

[ . . . ]

7.2 Conclusions for PC5 DRX Operations

For Key Issue #1 (Support of QoS aware NR PC5 power efficiency for pedestrian UEs), regarding NR PC5 DRX operations the following principles are taken as the interim conclusion:

The V2X application layer provides inputs for V2X layer to determine PC5 DRX assistance information.

Editor's note: It is FFS whether the inputs described in TS 23.287 [5] (e.g. V2X Application Requirements) are sufficient or additional inputs (e.g. traffic pattern) are needed from the V2X application layer.

The V2X layer may provide the PC5 DRX assistance information to the AS layer.

Editor's note: It is FFS whether PC5 DRX assistance information, which is provided to the AS layer by the V2X layer, is defined in 3GPP and what is the content of the PC5 DRX assistance information.

Editor's note: It is FFS if the PC5 DRX assistance information is per mode of communication (i.e. unicast/broadcast/groupcast).

The Access Stratum (AS) layer determines the PC5 DRX for V2X communication over PC5 reference point to enable pedestrian UE power saving.

The AS layer provides the applied PC5 DRX information to the V2X layer.

For unicast, the PC5 DRX may be negotiated between the UEs in AS layer, pending on the feedback from RAN2.

Editor's note: The design principles need to be evaluated by RAN WGs.

Editor's note: It is FFS whether DRX related parameters are needed and what is the contents, which is (pre-) configured on the UE to assist the V2X layer determine the PC5 DRX assistance information.

3GPP TR 23.776 V2.0.0 introduced the following:

6.5 Solution #5: Solution for Applying PC5 DRX Configuration for Pedestrian UEs 6.5.1 Functional Description This solution is for "Key Issue #1: Support of QoS aware NR PC5 power efficiency for pedestrian UEs".

The UEs receive PC5 DRX configuration for transmitting/receiving V2X messages over PC5 from the network. The network configures the Pedestrian UEs with a PC5 DRX configuration over PC5 taking into account the V2X service types supported by the network and the V2X applications QoS requirements.

Two options are provided for the Pedestrian UE to receive V2X configuration information:

Option 1: Default PC5 DRX configuration is provided by the AMF during the registration procedure Option 2: The AF/PCF provides mapping of PQI(s) to PC5 DRX configuration The PC5 DRX configuration information for PQI includes the following:

A "ran2_offset" that defines at what point in the SFN cycle is the DRX configuration is applied DRX cycle configuration Editor's note: Whether the AS layer requires PC5 DRX configuration to determine PC5 DRX requires confirmation from RAN.

In Option 1, the AMF can provide a default PC5 DRX configuration to the UE during the registration procedure. The default PC5 DRX configuration provided to the UE applies for all cast types and all V2X service types. When the UE is authorized to use V2X communication over PC5 reference point as Pedestrian UE as defined in clause 6.5.2 of TS 23.287 [5], the AMF determines the PC5 DRX configuration is required for the UE based on the UE subscription and if required provides the PC5 DRX Configuration to the UE. The AMF ensures that all UEs registered on the same areas receive the same PC5 DRX configuration. The default PC5 DRX configuration that is provided to the UE is based on pre-configuration at the AMF. The network operator configures the default PC5 DRX taking into account the QoS requirements of V2X applications providing pedestrian services. Whether the same default PC5 DRX configuration is used in all AMFs of a PLMN or a different PC5 DRX configuration is used at each AMF is up to network operator deployment.

In the inter-PLMN scenario, the default PC5 DRX configuration needs to be coordinated amongst all PLMNs serving a specific region.

In Option 2, the AF/PCF includes PC5 DRX configuration within V2X configuration information during UE Policy delivery procedure defined in clause 6.2 of TS 23.287 [5]. The configuration information includes mapping of PQI(s) to a specific PC5 DRX Configuration.

Editor's note: Coordination with RAN is required to confirm if AS layer or V2X layer derives the DRX for PC5.

The UE applies the received PC5 DRX configuration as follows and shown in FIG. 6.5.1-1.
  The UE configures an "Active Time" and an "Inactive Time" for V2X Communication over PC5 based on the received PC5 DRX configuration.
  When the UE is in "Inactive Time" the UE enters in a "sleep" state and does not transmit or listen for V2X messages over PC5
  When the UE is in "Active Time" the UE can transmit V2X messages provided by the V2X application layer or listen for V2X messages over PC5. If the V2X application provides the data during the UE's inactive state the UE buffers the data and transmits them during the Active Time Period.
  Editor's note: The exact procedure for the UE to apply the received DRX configuration requires coordination with RAN.

Figure 12:
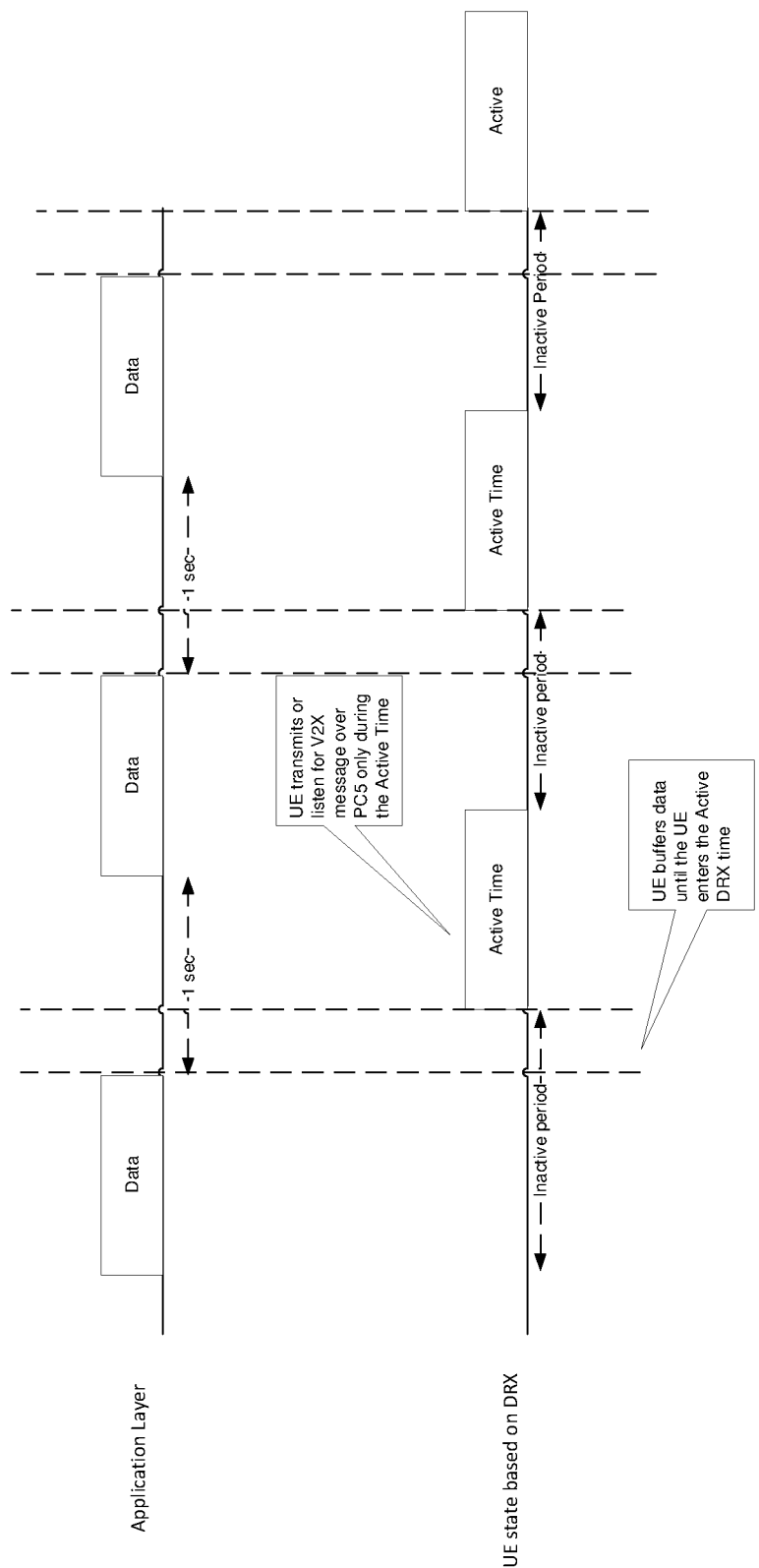
FIG. 12 is a reproduction of FIG. 6.5.1-1 of 3GPP TS 73.776 V2.0.0.

[FIG. 6.5.1-1 of 3GPP TS 73.776 V2.0.0, Entitled "Transmitting/Receiving V2X Messages Over PC5 Based on PC5 DRX Configuration", is Reproduced as FIG. 12]

In certain scenarios, some V2X applications may provide the V2X layer with the specific V2X Application Requirements as described in TS 23.287 [5], to send V2X messages over PC5 for a V2X service type as defined in clause 5.4.1.1.2 of TS 23.287 [5]. In such cases the PC5 DRX configuration provided by the network may not be adequate to sustain such V2X application QoS requirements. The UE may add an offset in the configured PC5 DRX extending the "Active Time" for transmitting the data to support the QoS requirements of the application. This is shown in FIG. 6.5.1-2.
  Editor's note: How the UE determines the offset if default PC5 DRX configuration is provided will be defined in RAN

Figure 13:
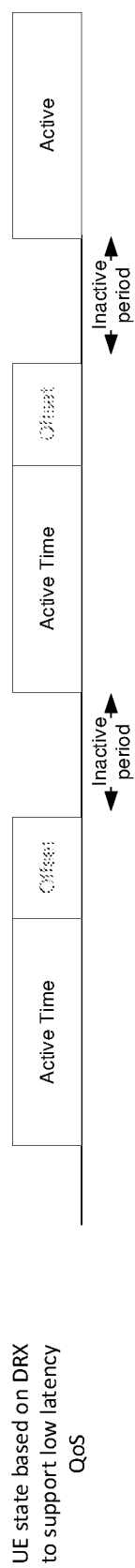
FIG. 13 is a reproduction of FIG. 6.5.1-2 of 3GPP TS 73.776 V2.0.0.

[FIG. 6.5.1-2 of 3GPP TS 73.776 V2.0.0, Entitled "Extending PC5 DRX to Support Required QoS", is Reproduced as FIG. 13]

If the UE has received PC5 DRX configuration for PQI as part of V2X configuration information, the V2X layer in the UE provides to the AS layer the PC5 DRX configuration by following PC5 QoS Flow derivation as described in TS 23.287 [5] as follows:
  Based on the V2X application provided QoS requirements or the mapping of the V2X service type to PC5 QoS parameters, the V2X layer determines PC5 QoS Parameters.
  Based on the PQI, the V2X layer determines PC5 DRX configuration information from V2X configuration information.
  The V2X layer determines the PC5 QoS Flow (creates new or modifies an existing one) and passes to the AS layer the PC5 QoS requirements and PC5 DRX configuration for the PC5 QoS Flow.
  The AS layer applies the PC5 DRX configuration and determines Active Time and Offset.

For a receiving UE, the UE determines the PC5 DRX as follows:
  The UE applies the default PC5 DRX if provided by the AMF or
  The UE determines the destination layer-2 IDs for broadcast/groupcast reception based on the mapping of V2X service types to Destination Layer-2 ID(s) for broadcast/groupcast as specified in clause 5.6.1.2 of TS 23.287 [5]. The receiving UE then determines the PC5 QoS parameters based on the mapping of V2X service types to PC5 QoS parameters as specified in clause 5.1.2.1 of TS 23.287 [5] or based on QoS requirements provided by the application. The receiving UE then applies the PC5 DRX according to the mapping of PQI(s) to PC5 DRX configuration.

In case, a Pedestrian UE has multiple active PC5 QoS Flows with different PC5 QoS parameters each having a different PC5 DRX configuration, it is proposed the AS layer to configure a DRX cycle that combines all PC5 DRX configurations. This ensures that the UE will be able to monitor and send V2X messages from all "active" V2X applications. In addition, the AS layer can determine to switch the UE in "always-on" mode if there is no power efficiency by combining all DRX configuration.

In case the UE has received both default PC5 DRX configuration information from the AMF and the PC5 DRX configuration information for PQI from the AF/PCF, therefore the V2X layer provides both to the AS layer, the AS layer can also combine the PC5 DRX configuration.
  Editor's note: How the AS layer combines the PC5 DRX configuration needs to be defined/confirmed in RAN groups Once the UE determines the offset the UE applies the offset for all V2X communications over unicast, groupcast or broadcast.

6.5.2 Procedures

FIG. 6.5.2-1 provides the procedure for applying the PC5 DRX configuration.

Figure 14:
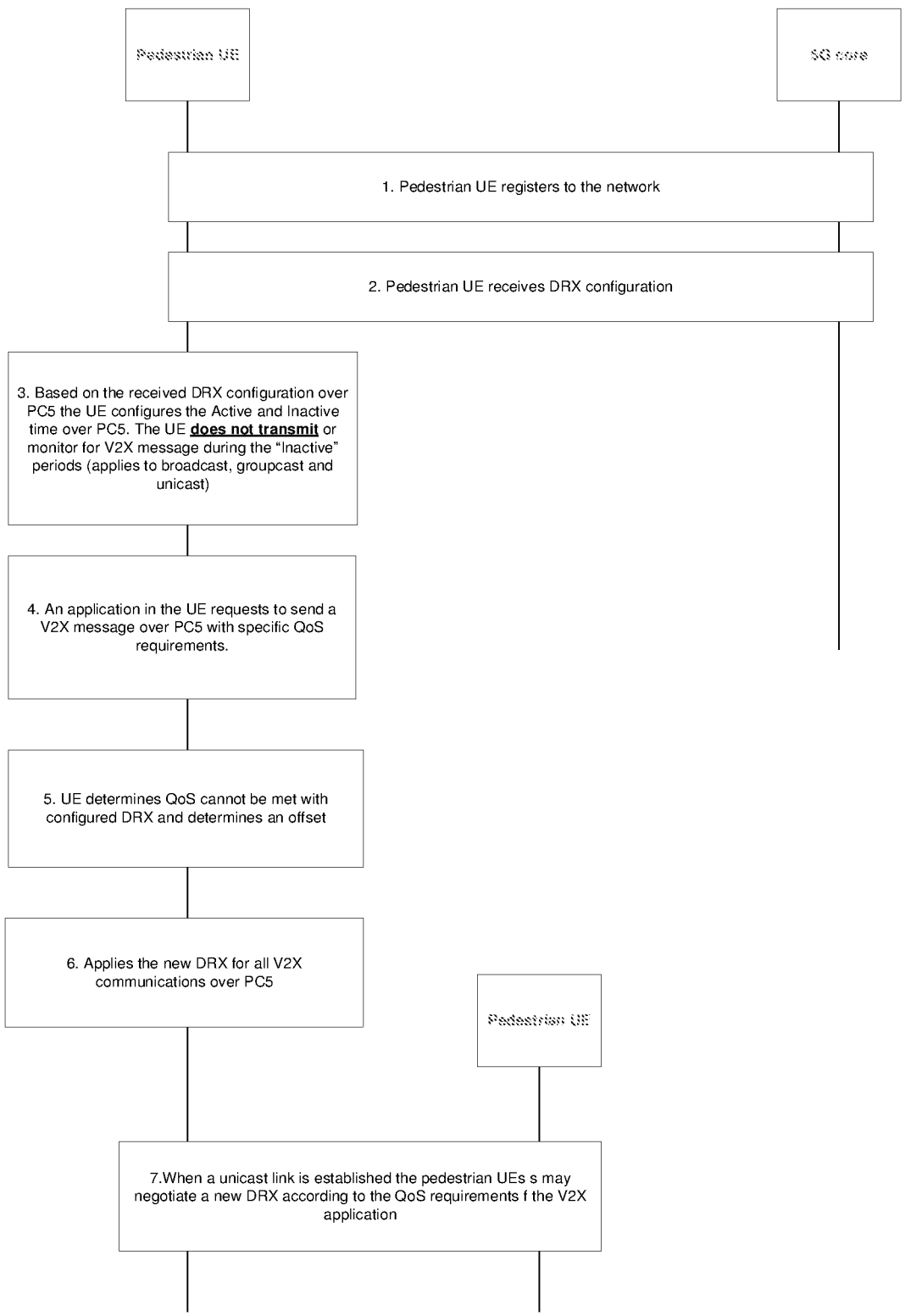
FIG. 14 is a diagram according to one exemplary embodiment.

[FIG. 6.5.2-1 of 3GPP TS 73.776 V2.0.0, Entitled "UE Applying Received PC5 DRX Configuration, is Reproduced as FIG. 14]

1. Pedestrian UEs register to the 5G network using standard procedures.
2. The Pedestrian UE receives PC5 DRX configuration from the network (either based on Option 1 and/or Option 2 described in clause 6.5.1).
3. Based on the received PC5 DRX configuration the AS layer in the UE determines an Active Time and an Inactive Time. The UE transmits and/or listen for V2X messages over PC5 only during the DRX Active Time.
4. An application in the UE requests to send a V2X message over PC5 with specific QoS requirements by providing V2X Application Requirements to the V2X layer as described in TS 23.287 [5]. The V2X layer determines the PC5 QoS parameters based on the V2X Application Requirements and provide them to the AS layer as defined in clause 5.4.1.1.3 of TS 23.287 [5]. If the UE has received PC5 DRX configuration within V2X configuration information from the AF/PCF, the V2X layer also includes PC5 DRX configuration for each applicable PC5 QoS Flow.
5. If the V2X layer provided the default PC5 DRX configuration, the AS layer in the UE determines that the configured PC5 DRX cannot support the QoS requirements and determines an additional offset in the configured PC5 DRX to support the required QoS. If the V2X layer provided the PC5 DRX configuration for the PC5 QoS Flow, the AS layer determines the PC5 DRX taking into account the PC5 DRX configuration for all PC5 QoS Flows (default PC5 DRX configuration and/or PC5 DRX configuration for each PC5 QoS Flow).
6. The AS layer applies the PC5 DRX for all sidelink communications over PC5 for any V2X service.
7. When a pedestrian UE establishes a unicast link with a UE for V2X communication, the UEs may negotiate a new PC5 DRX according to the QoS requirements of the application requiring to send V2X messages via this unicast link.

6.5.3 Impacts on Services, Entities and Interfaces
UE:
As Layer:
Applies PC5 DRX configuration over PC5 for both V2X transmission and reception.
Determines DRX offset to support specific QoS requirements if default PC5 DRX configuration cannot sustain the QoS requirements.
Determines DRX offset based on PC5 DRX configuration provided by V2X layer.
V2X Layer:
Determines PC5 DRX configuration based on V2X configuration information containing a mapping of PC5 DRX to PQI provided by the AF/PCF.
AMF:
Determines and provides PC5 DRX configuration for pedestrian UEs.
AF/PCF
Provides mapping of PQI(s) to PC5 DRX Configuration.
[ . . . ]
7.2 Conclusions for PC5 DRX Operations
For Key Issue #1 (Support of QoS aware NR PC5 power efficiency for pedestrian UEs), regarding NR PC5 DRX operations the following principles are taken as the conclusion:
The Access Stratum (AS) layer determines the PC5 DRX parameter values for V2X communication over PC5 reference point to enable pedestrian UE power saving.
The existing PC5 QoS parameters provided by the V2X layer can be used by the AS layer to determine the PC5 DRX parameter values.
For groupcast and broadcast, the AS layer of Rx UE needs PC5 QoS parameters to determine the PC5 DRX parameter values for V2X communication over PC5 reference point. Therefore, the V2X layer of Rx UE determines the interested V2X service types, and derives the corresponding PC5 QoS parameters based on either the mapping of V2X service types to PC5 QoS parameters, or the V2X Application Requirements for the V2X service type (e.g. priority requirement, reliability requirement, delay requirement, range requirement) provided by the application layer. The V2X layer of Rx UE passes the PC5 QoS parameters together with the corresponding destination layer-2 ID(s) for reception to the AS layer.
The AS layer provides the applied PC5 DRX information to the V2X layer.
NOTE 1: For what purpose the PC5 DRX information is used by the V2X layer, e.g. whether the V2X layer exposes transmission schedule information to the V2X application layer (including why the PC5 DRX information needs to be exposed to the V2X application layer, given that Uu DRX information is not provided to the application layer from NAS layer, and what is the content for the transmission schedule information) will be determined in the normative phase based on the applied PC5 DRX information provided by the AS layer to the V2X layer to be defined in RAN2.
For unicast, two UEs may negotiate the PC5 DRX configuration in AS layer, and the PC5 DRX can be configured per a pair of source/destination UE addresses in AS layer.
For broadcast and groupcast, and for out-of-coverage case (i.e., when the UE is "not served by E-UTRA" and "not served by NR"), the AS layer of UE uses the provisioned PC5 DRX configuration for PC5 DRX operation.
NOTE 2: The granularity/level of provisioned PC5 DRX configuration used for broadcast and groupcast (e.g. mapping information for PC5 DRX parameters), and for out-of-coverage case will be determined in the normative phase based on RAN2 decision or via coordination with RAN2.
NOTE 3: The provisioned PC5 DRX configuration can be from different sources (e.g., by PCF or by V2X Application Server via V1 reference point). The provisioned PC5 DRX configuration is expected to be consistent.
NOTE 4: For unicast, for out-of-coverage case, whether to use the provisioned PC5 DRX configuration will be determined in the normative phase based on RAN2 decision.

According to 3GPP TS 38.300 and TS 38.321, NR Uu specified one mechanism for saving UE power on monitoring downlink control channel (e.g. Physical Downlink Control Channel (PDCCH)). If a UE is configured with discontinuous reception (DRX) by its serving base station (e.g. gNB), the UE does not have to continuously monitor the downlink control channel. Basically, DRX mechanism is characterized by following:
on-duration: duration that the UE waits for, after waking up, to receive PDCCHs. If the UE successfully decodes a PDCCH, the UE stays awake and starts the inactivity timer.
inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions).
retransmission-timer: duration until a retransmission can be expected.
cycle: specifies the periodic repetition of the on-duration followed by a possible period of inactivity.
active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

According to 3GPP RP-193231, Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized. In general, DRX mechanism operates periodic repetition of on-duration followed by inactivity period. Therefore, DRX mechanism is applicable for reception of periodic traffic. In one embodiment, DRX pattern of on-duration may be designed, applied, or assigned mainly based on periodic traffic pattern.

In Uu, DRX wake-up time is determined based on system frame number and subframe number which are synced between UE and gNB. When operating sidelink communication, the timing to align sidelink Transmission Time Interval (TTI) for monitoring sidelink control channel could be synced with gNB, Global Navigation Satellite Systems (GNSS), or a synchronization reference UE. For example, UE1 and UE2 communicate each other. UE2 monitors a sidelink signal or channel for synchronization (e.g. Physical Sidelink Broadcast Channel (PSBCH), or a signal or channel including MasterInformationBlockSidelink) sent by UE1 if UE1 is a synchronization reference UE. In the sidelink signal or channel for synchronization, information about frame number (e.g. directFrameNumber) and/or time slot (e.g. slotIndex) used to send this sidelink signal or channel for synchronization could be included so that frame number and/or time slot of UE2 can be synced with frame number and/or time slot of UE1.

Basically, UE1 has to transmit sidelink packets to UE2 at the period or time duration on which UE2 is awake for receiving these sidelink packets. Otherwise, these sidelink packets may be lost at UE2 if UE1 transmits these sidelink packets when UE2 is on the "sleep" period. According to one alternative (discussed in 3GPP TR 23.776), each sidelink service could be associated with one sidelink DRX configuration. The association between sidelink service and sidelink DRX configuration could be pre-defined or pre-configured in UE or provisioned by network through authorization procedure. The association between sidelink service and sidelink DRX configuration could be applicable for unicast sidelink communication, broadcast sidelink communication and/or groupcast sidelink communication. For example, UE1 could initialize a sidelink service toward UE2 and establishes a unicast link with UE2. As another example, UE1 and UE2 could perform a sidelink service which will initialize groupcast sidelink communication. Thus, UE1 and UE2 will form a group for the groupcast sidelink communication.

According to the sidelink DRX configuration for a given sidelink service, UE1 may know how long UE2 stays awake after waking up (i.e. on-duration in each cycle of sidelink DRX) and the time interval between each wake-up period (i.e. cycle length of sidelink DRX). More specifically, the sidelink DRX configuration (i.e. the on-duration in each cycle of sidelink DRX, and the cycle length of sidelink DRX) may be determined or derived based on traffic pattern of the given sidelink service. This could be illustrated in FIG. 12. However, UE1 has no information about time to start such wake-up period of the sidelink DRX configuration (i.e. startOffset for on-duration in each cycle of sidelink DRX), so that UE1 may send sidelink control information and/or sidelink transmission to UE2 at wrong time. Similarly, UE2 also has no the information about time to start such wake-up period of the sidelink DRX configuration, so that UE2 may monitor sidelink control information and/or receive sidelink transmission from UE1 at wrong time. To address this problem, some methods to determine when to start a wake-up period of a sidelink DRX configuration could be considered.

For groupcast, each group could be associated with one group ID. Each group could be also associated with one groupcast destination Layer-2 ID (L2ID). A groupcast destination L2ID could be derived from a group ID. Different groups may be associated with different group IDs or different groupcast destination L2IDs.

Possibly, a time to start a wake-up period of a sidelink DRX configuration for a group could be derived from or could be determined based on a group ID or a groupcast destination L2ID associated with the group. In one embodiment, a time to start a wake-up period of a sidelink DRX configuration for a group could be derived from or could be determined based on a Vehicle-to-Everything (V2X) layer ID or value (e.g. Group ID, groupcast destination L2ID, or . . . ) or an application layer ID or value (which could have been negotiated or exchanged between each member in the group via application layer signalling) associated with the group.

In one embodiment, upper layer (e.g. V2X layer) of the UE could provide the V2X layer ID or value or the application layer ID or value to lower layer (i.e. Access Stratum (AS) layer, e.g. Radio Resource Control (RRC) layer, Medium Access Control (MAC) layer, or Physical (PHY) layer) of the UE. The lower layer of the UE could then derive the time to start the wake-up period of the sidelink DRX configuration from the V2X layer ID or value or the application layer ID or value.

In one embodiment, the upper layer of the UE could directly provide the time to start the wake-up period of the sidelink DRX configuration to the lower layer of the UE. The lower layer of the UE could then apply the time to start the wake-up period of the sidelink DRX configuration. In this alternative, the upper layer of the UE could derive the time to start the wake-up period of the sidelink DRX configuration from the V2X layer ID or value or the application layer ID or value.

Since each member in the group knows/acquires the same V2X layer ID/value or the same application layer ID/value associated with the group, each member in the group will then derive/determine or apply the same time to start the wake-up period of the sidelink DRX configuration associated with the group. In one embodiment, for a sidelink group comprising at least a UE1, the UE1 could derive or determine a time to start a wake-up period of a sidelink DRX configuration for the sidelink group based on group ID or destination Learning from Limited and Imperfect Data (L2ID) associated with the group. The UE1 could perform sidelink transmission to the sidelink group (e.g., to other UEs within the sidelink group) based on or within the wake-up period. The UE2 could perform sidelink reception from the sidelink group (e.g., from other UEs within the sidelink group) based on or within the wake-up period.

Moreover, it will separate wake-up periods for different groups at different timing, so that it would reduce resource collisions in case these sidelink transmissions occur at the same wake-up period across all groups. This benefit could be also applicable to sidelink unicast communication.

For unicast, each pair of UEs over a unicast link could be associated with one source L2ID and one destination L2ID. For instance, UE1 and UE2 could establish a unicast link for sidelink communication. From UE1 aspect, the source L2ID is UE1's L2ID and the destination L2ID could be UE2's L2ID. When UE1 transmits a sidelink transmission to the UE2, the source L2ID associated with the sidelink transmission could be (set to) UE1's L2ID and the destination L2ID associated with the sidelink transmission could be (set to) UE2's L2ID. From UE2's perspective, the source L2ID could be UE2's L2ID and the destination L2ID could be UE1's L2ID. When UE2 transmits a sidelink transmission to the UE1, the source L2ID associated with the sidelink transmission could be (set to) UE2's L2ID and the destination L2ID associated with the sidelink transmission could be (set to) UE1's L2ID.

Possibly, a time to start a wake-up period of a sidelink DRX configuration for a unicast link could be derived from or could be determined based on a source L2ID and/or a destination L2ID associated with the unicast link. In one embodiment, for a unicast link established between UE1 and UE2, a time to start a wake-up period of a sidelink DRX configuration for the unicast link could be derived from or could be determined based on a UE1's L2ID and/or UE2's L2ID.

In one embodiment for a unicast link between UE1 and UE2, the UE1 could derive or determine the time to start a wake-up period of a sidelink DRX configuration for the unicast link based on UE1's L2ID and UE2's L2ID. The UE1 could perform sidelink transmission to the UE2 based on or within the wake-up period. The UE1 could perform sidelink reception from the UE2 based on or within the wake-up period. In one embodiment, the UE2 could derive or determine the time to start a wake-up period of a sidelink DRX configuration for the unicast link based on UE2's L2ID and UE1's L2ID. The UE2 could perform sidelink transmission to the UE1 based on or within the wake-up period. The UE2 could perform sidelink reception from the UE1 based on or within the wake-up period.

In one embodiment for a unicast link between UE1 and UE2, the UE1 could derive or determine a first time to start a first wake-up period of a sidelink DRX configuration for the unicast link based on UE1's L2ID. The UE1 could perform sidelink reception from the UE2 based on or within the first wake-up period. The UE2 could derive or determine the first time to start the first wake-up period of a sidelink DRX configuration for the unicast link based on UE1's L2ID. The UE2 could perform sidelink transmission to the UE1 based on or within the first wake-up period. In one embodiment, the UE2 could derive or determine a second time to start a second wake-up period of a sidelink DRX configuration for the unicast link based on UE2's L2ID. The UE2 could perform sidelink reception from the UE1 based on or within the second wake-up period. The UE1 could derive or determine the second time to start the second wake-up period of a sidelink DRX configuration for the unicast link based on UE2's L2ID. The UE1 could perform sidelink transmission to the UE2 based on or within the second wake-up period.

In one embodiment for a unicast link between UE1 and UE2, the UE1 could derive or determine a first time to start a first wake-up period of a sidelink DRX configuration for the unicast link based on UE1's L2ID. The UE1 could perform sidelink transmission to the UE2 based on or within the first wake-up period. The UE2 could derive or determine the first time to start the first wake-up period of a sidelink DRX configuration for the unicast link based on UE1's L2ID. The UE2 could perform sidelink reception from the UE1 based on or within the first wake-up period. In one embodiment, the UE2 could derive or determine a second time to start a second wake-up period of a sidelink DRX configuration for the unicast link based on UE2's L2ID. The UE2 could perform sidelink transmission to the UE1 based on or within the second wake-up period. The UE1 could derive or determine the second time to start the second wake-up period of a sidelink DRX configuration for the unicast link based on UE2's L2ID. The UE1 could perform sidelink reception from the UE2 based on or within the second wake-up period.

In one embodiment for a unicast link between UE1 and UE2, the UE1 could derive or determine a first time to start a first wake-up period of a sidelink DRX configuration for the unicast link based on UE1's L2ID. The UE1 could perform sidelink reception from the UE2 based on or within the first wake-up period. The UE2 could derive or determine the first time to start the first wake-up period of a sidelink DRX configuration for the unicast link based on UE1's L2ID. The UE2 could perform sidelink transmission to the UE1 based on or within the first wake-up period. In one embodiment, the UE2 could derive or determine the first time to start the first wake-up period of a sidelink DRX configuration for the unicast link based on UE1's L2ID. The UE2 could perform sidelink reception from the UE1 based on or within the first wake-up period. The UE1 could derive or determine the first time to start the first wake-up period of a sidelink DRX configuration for the unicast link based on UE1's L2ID. The UE1 could perform sidelink transmission to the UE2 based on or within the first wake-up period.

In one embodiment for a unicast link between UE1 and UE2, the UE1 could derive or determine a second time to start a second wake-up period of a sidelink DRX configuration for the unicast link based on UE2's L2ID. The UE1 could perform sidelink transmission to the UE2 based on or within the second wake-up period. The UE2 could derive or determine the second time to start the second wake-up period of a sidelink DRX configuration for the unicast link based on UE2's L2ID. The UE2 could perform sidelink reception from the UE1 based on or within the second wake-up period. In one embodiment, the UE2 could derive or determine the second time to start the second wake-up period of a sidelink DRX configuration for the unicast link based on UE2's L2ID. The UE2 could perform sidelink transmission to the UE1 based on or within the second wake-up period. The UE1 could derive or determine the second time to start the second wake-up period of a sidelink DRX configuration for the unicast link based on UE2's L2ID. The UE1 could perform sidelink reception from the UE2 based on or within the second wake-up period.

In one embodiment, it could be possible that some parameters in a sidelink DRX configuration except for a parameter used for determining time to start wake-up period could be negotiated between two UEs (via PC5-S message, PC5-RRC message or MAC control element) but the parameter used for determining time to start wake-up period could be derived from or could be determined based on the source L2ID (e.g., UE1's L2ID or UE2's L2ID) and/or the destination L2ID (e.g., UE2's L2ID or UE1's L2ID) associated with the unicast link.

Alternatively, the parameter used for determining time to start wake-up period could be negotiated between two UEs (e.g., UE1 and UE2 of a unicast link). For example, UE1 could provide one or more candidate values of time to start wake-up period to UE2 (through e.g. PC5-S message, PC5-RRC message or MAC control element), and UE2 could then respond to UE1 with one of them for a determined value of time to start wake-up period (through e.g. PC5-S message, PC5-RRC message or MAC control element). In response to receipt of the determined value of time to start wake-up period, UE1 may apply/use the determined value of time to start wake-up period to start a wake-up period for the unicast link.

In one embodiment, UE1 may perform sidelink transmission to the UE2 based on or within the wake-up period. Alternatively, UE1 may perform sidelink reception from the UE2 based on or within the wake-up period. In response to the response, UE2 may also apply/use the determined value of time to start wake-up period to start the wake-up period for the unicast link. In one embodiment, UE2 may perform sidelink transmission to the UE1 based on or within the wake-up period. Alternatively, UE2 may perform sidelink reception from the UE1 based on or within the wake-up period.

In order to maximize power saving, wake-up time for sidelink DRX could be aligned with wake-up time for Uu DRX. If UE1 is configured with Uu DRX by its gNB, UE1 could determine a time to start wake-up period of sidelink DRX based on the time to start wake-up period of Uu DRX. In one embodiment, if UE1 is configured with Uu DRX by its gNB, UE1 could determine the one or more candidate values of time to start wake-up period of sidelink DRX based on the time to start wake-up period of UE1's Uu DRX. In one embodiment, if UE2 is configured with Uu DRX by its gNB, UE2 could determine one of the one or more candidate values based on the time to start wake-up period of UE2's Uu DRX. Alternatively, if UE1 is not configured with Uu DRX by its gNB or UE1 is out-of-coverage, UE1 could determine a time to start wake-up period of sidelink DRX based on the source L2ID (e.g., UE1's L2ID or UE2's L2ID) and/or the destination L2ID (e.g., UE2's L2ID or UE1's L2ID) associated with the unicast link with UE2. UE1 could then configure UE2 to follow the determined time to start wake-up period of sidelink DRX (via e.g. PC5-S message, PC5-RRC message or MAC control element).

More specifically, the association between sidelink service and sidelink DRX configuration could be that an identity of a sidelink service (e.g. PSID) or an identity of an application offering the sidelink service (e.g. AID) is associated with one sidelink DRX configuration. More specifically, the wake-up period could be determined based on an on-duration of a sidelink DRX cycle.

More specifically, the time to start the wake-up period could be based on a startOffset of a sidelink DRX cycle. The time to start the wake-up period may mean a slot offset (e.g. drx-SlotOffsetSL) used for determining a delay before starting the on-duration timer. The time to start the wake-up period may mean a cycle start offset (e.g. drx-StartOffset) used for determining a subframe where the SL DRX cycle starts.

More specifically, the sidelink DRX configuration could configure at least one of an on-duration timer (e.g. drx-onDurationTimerSL) used for determining a duration at the beginning of a SL DRX cycle, an inactive timer (e.g. drx-InactivityTimerSL) used for determining a duration after a Physical Sidelink Control Channel (PSCCH) occasion in which a sidelink control information indicates a sidelink transmission, a retransmission timer (e.g. drx-RetransmissionTimerSL) used for determining a maximum duration until a sidelink retransmission is received, a cycle length (e.g. drx-LongCycleStartOffsetSL) used for determining a length of the SL DRX cycle, a short cycle length (e.g. drx-ShortCycleSL) used for determining a length of a second SL DRX cycle shorter than the length of the SL DRX cycle, and/or a round trip-time timer (e.g. drx-HARQ-RTT-TimerSL) used for determining a maximum duration before a sidelink HARQ retransmission grant is expected. In one embodiment, the sidelink DRX configuration does not comprise the time to start the wake-up period of the sidelink DRX configuration.

More specifically, the unit for the time to start of wake-up period for sidelink DRX could be slot, symbol or subframe. The wake-up period for sidelink DRX could be started at a specific sidelink frame number and/or a specific sidelink time slot.

More specifically, the specific sidelink frame number and/or the specific sidelink time slot could be determined based on or could be derived from the V2X layer ID/value (e.g. Group ID, groupcast destination L2ID, or . . . ) or the application layer ID/value, if the sidelink DRX is applied for sidelink groupcast communication. The specific sidelink frame number and/or the specific sidelink time slot could be determined based on or could be derived from a source L2ID and/or a destination L2ID associated with a unicast link, if the sidelink DRX is applied for sidelink unicast communication. The specific sidelink frame number and/or the specific sidelink time slot could be determined based on or could be derived from an identifier used to identify a unicast link, if the sidelink DRX is applied for sidelink unicast communication.

More specifically, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean that (part of) the ID value is a derivation factor for (deriving/determining) the time. Cycle length of sidelink DRX may also be a derivation factor for (deriving/determining) the time.

More specifically, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean that (part of) the ID1 value and (part of) the ID2 value are both derivation factor for (deriving/determining) the time. Cycle length of sidelink DRX may also be a derivation factor for (deriving/determining) the time.

More specifically, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean that (part of) the ID value is in a formula for (deriving/determining) the time. Cycle length of sidelink DRX may also be in the formula for (deriving/determining) the time.

More specifically, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean that (part of) the ID1 value and (part of) the ID2 value are both in a formula for (deriving/determining) the time. Cycle length of sidelink DRX may also be in the formula for (deriving/determining) the time.

More specifically, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean a value for (deriving/determining) the time is equal to a derived value via (part of) the ID value module cycle length of sidelink DRX.

More specifically, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean a value for (deriving/determining) the time is equal to a derived value via a summation value of (part of) the ID1 value and (part of) the ID2 value module cycle length of sidelink DRX.

More specifically, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean a value for (deriving/determining) the time is derived as (part of) the ID value module cycle length of sidelink DRX.

More specifically, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean a value for (deriving/determining) the time is derived as a summation value of (part of) the ID1 value and (part of) the ID2 value module cycle length of sidelink DRX.

More specifically, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean a value for (deriving/determining) the time is equal to a derived value of "((part of) the ID value) mod (cycle length of sidelink DRX)". In one embodiment, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean a value for (deriving/determining) the time is equal to a derived value of "(A*((part of) the ID value)+B) mod (cycle length of sidelink DRX)". A may be another derivation factor for (deriving/determining) the time. A may be a random number or a variable number or a configured number. B may be another derivation factor for (deriving/determining) the time. B may be a random number or a variable number or a configured number.

More specifically, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean a value for (deriving/determining) the time is equal to a derived value of "((part of) the ID1 value+(part of) the ID2 value) mod (cycle length of sidelink DRX)". In one embodiment, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean a value for (deriving/determining) the time is equal to a derived value of "(A1*((part of) the ID1 value)+A2*((part of) the ID2 value)+B) mod (cycle length of sidelink DRX)". A1 may be another derivation factor for (deriving/determining) the time. A1 may be a random number or a variable number or a configured number. A2 may be another derivation factor for (deriving/determining) the time. A2 may be a random number or a variable number or a configured number. A1 and A2 may be different or the same. B may be another derivation factor for (deriving/determining) the time. B may be a random number or a variable number or a configured number.

More specifically, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean a value for (deriving/determining) the time is derived as "((part of) the ID value) mod (cycle length of sidelink DRX)". In one embodiment, deriving or determining a time (e.g., any one of the time to start a wake-up period of a sidelink DRX configuration for the sidelink group, or the time to start a wake-up period of a sidelink DRX configuration for the unicast link) based on a ID (e.g., any one of V2X layer ID/value, application layer ID/value, Group ID, groupcast destination L2ID, source L2ID, destination L2ID, UE1's L2ID, or UE2's L2ID) may mean a value for (deriving/determining) the time is derived as "(A*((part of) the ID value)+B) mod (cycle length of sidelink DRX)". A may be another derivation factor for (deriving/determining) the time. A may be a random number or a variable number or a configured number. B may be another derivation factor for (deriving/determining) the time. B may be a random number or a variable number or a configured number.

More specifically, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean a value for (deriving/determining) the time is derived as "((part of) the ID1 value+(part of) the ID2 value) mod (cycle length of sidelink DRX)". In one embodiment, deriving or determining a time (e.g., the time to start a wake-up period of a sidelink DRX configuration for the unicast link) based on a ID1 and a ID2 (e.g., source L2ID and destination L2ID, or UE1's L2ID and UE2's L2ID) may mean a value for (deriving/determining) the time is derived as "(A1*((part of) the ID1 value)+A2*((part of) the ID2 value)+B) mod (cycle length of sidelink DRX)". A1 may be another derivation factor for (deriving/determining) the time. A1 may be a random number or a variable number or a configured number. A2 may be another derivation factor for (deriving/determining) the time. A2 may be a random number or a variable number or a configured number. A1 and A2 may be different or the same. B may be another derivation factor for (deriving/determining) the time. B may be a random number or a variable number or a configured number.

In one embodiment, the ID value means a decimal value of the ID. Part of the ID may mean some (not all) LSB bits of the ID. Part of the ID value may mean a decimal value of some (not all) LSB bits of the ID.

In one example, the ID is 24 bits. The part of the ID is LSB 16 bits of the ID. The part of the ID value is a decimal value of the LSB 16 bits of the ID. The LSB portion of the ID is the LSB 16 bits of the ID. The value portion of the ID value is a decimal value of the LSB 16 bits of the ID.

In one embodiment, part of the ID may mean some (not all) MSB bits of the ID. Part of the ID value may mean a decimal value of some (not all) MSB bits of the ID.

In one example, the ID is 24 bits. The part of the ID is MSB 16 bits of the ID. The part of the ID value is a decimal value of the MSB 16 bits of the ID. The MSB portion of the ID is the MSB 16 bits of the ID. The value portion of the ID value is a decimal value of the MSB 16 bits of the ID.

Figure 16:
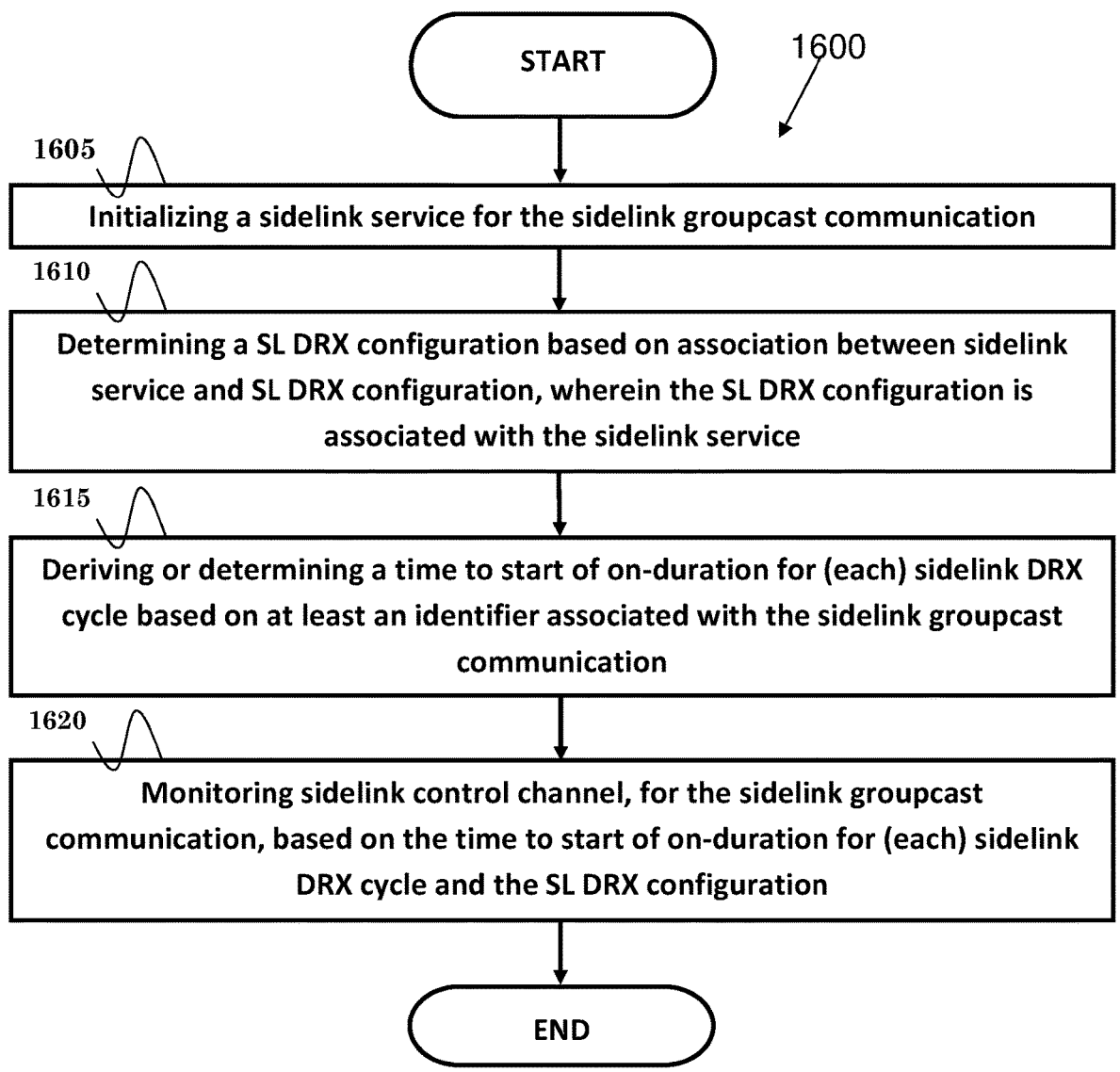
FIG. 16 is a flow chart according to one exemplary embodiment.

FIG. 16 is a flow chart 1600 illustrating a method for a second UE to configure SL DRX in a sidelink groupcast communication. In step 1605, the second UE initializes a sidelink service for the sidelink groupcast communication. In step 1610, the second UE determines a SL DRX configuration based on association between sidelink service and SL DRX configuration, wherein the SL DRX configuration is associated with the sidelink service. In step 1615, the second UE derives or determines a time to start of on-duration for (each) sidelink DRX cycle based on at least an identifier associated with the sidelink groupcast communication. In step 1620, the second UE monitors sidelink control channel, for the sidelink groupcast communication, based on the time to start of on-duration for (each) sidelink DRX cycle and the SL DRX configuration.

Referring back to FIGS. 3 and 4, in one exemplary embodiment of a method for a second UE to configure SL DRX in a sidelink groupcast communication, the second UE 300 includes a program code 312 stored in the memory 310. The CPU 308 could execute program code 312 to enable the second UE (i) to initialize a sidelink service for the sidelink groupcast communication, (ii) to determine a SL DRX configuration based on association between sidelink service and SL DRX configuration, wherein the SL DRX configuration is associated with the sidelink service, (iii) to derive or determine a time to start of on-duration for (each) sidelink DRX cycle based on at least an identifier associated with the sidelink groupcast communication, and (iv) to monitor sidelink control channel, for the sidelink groupcast communication, based on the time to start of on-duration for (each) sidelink DRX cycle and the SL DRX configuration. Furthermore, the CPU 308 can execute the program code 312 to perform all of the above-described actions and steps or others described herein.

Figure 17:
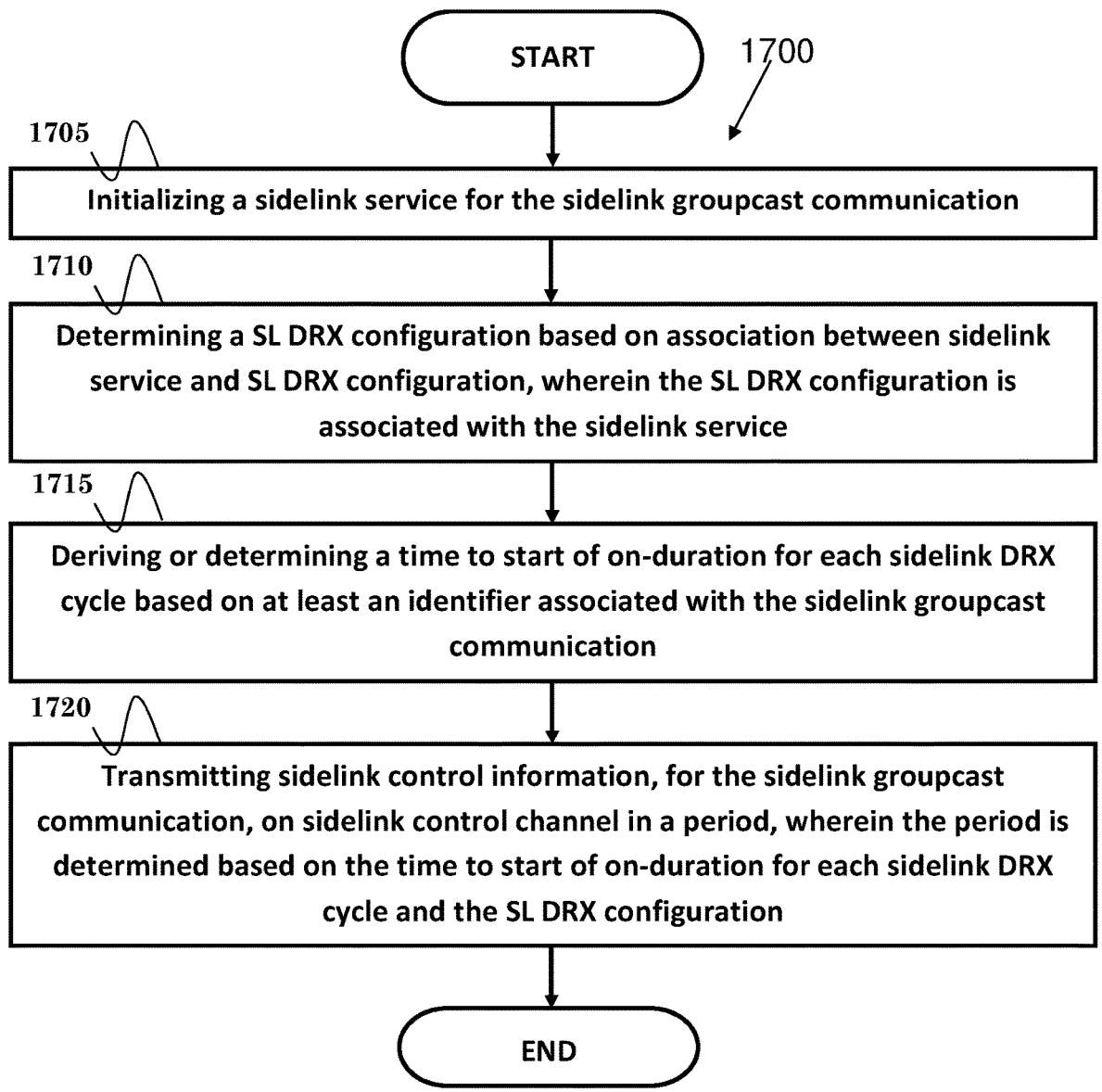
FIG. 17 is a flow chart according to one exemplary embodiment.

FIG. 17 is a flow chart 1700 illustrating a method for a first UE to consider SL DRX in a sidelink groupcast communication. In step 1705, the first UE initializes a sidelink service for the sidelink groupcast communication. In step 1710, the first UE determines a SL DRX configuration based on association between sidelink service and SL DRX configuration, wherein the SL DRX configuration is associated with the sidelink service. In step 1715, the first UE derives or determines a time to start of on-duration for each sidelink DRX cycle based on at least an identifier associated with the sidelink groupcast communication. In step 1720, the first UE transmits sidelink control information, for the sidelink groupcast communication, on sidelink control channel in a period, wherein the period is determined based on the time to start of on-duration for each sidelink DRX cycle and the SL DRX configuration.

Referring back to FIGS. 3 and 4, in one exemplary embodiment of a method for a first UE to consider SL DRX in a sidelink groupcast communication, the first UE 300 includes a program code 312 stored in the memory 310. The CPU 308 could execute program code 312 to enable the first UE (i) to initialize a sidelink service for the sidelink groupcast communication, (ii) to determine a SL DRX configuration based on association between sidelink service and SL DRX configuration, wherein the SL DRX configuration is associated with the sidelink service, (iii) to derive or determine a time to start of on-duration for each sidelink DRX cycle based on at least an identifier associated with the sidelink groupcast communication, and (iv) to transmit sidelink control information, for the sidelink groupcast communication, on sidelink control channel in a period, wherein the period is determined based on the time to start of on-duration for each sidelink DRX cycle and the SL DRX configuration. Furthermore, the CPU 308 can execute the program code 312 to perform all of the above-described actions and steps or others described herein.

Figure 18:
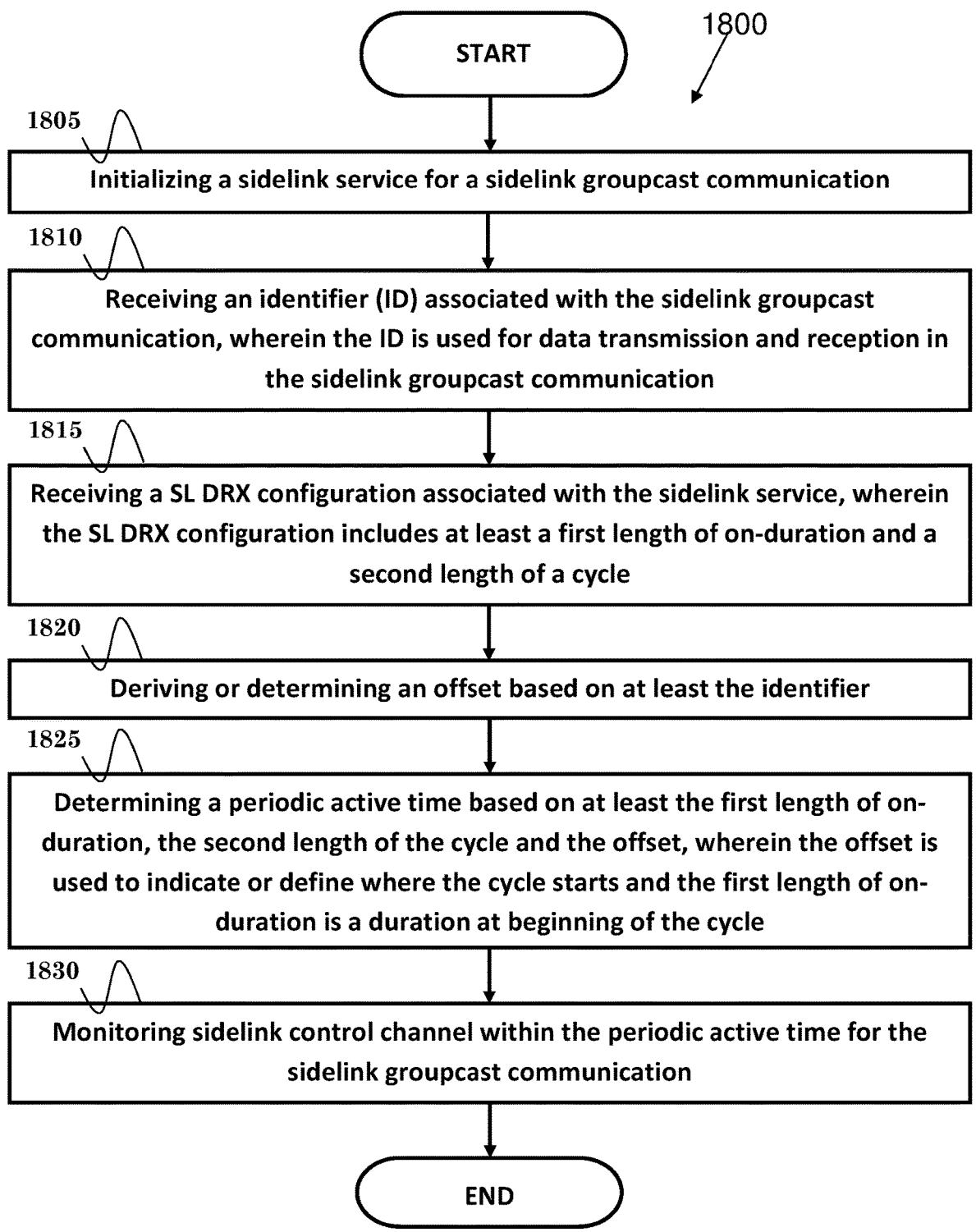
FIG. 18 is a flow chart according to one exemplary embodiment.

In the context of the embodiments shown in FIGS. 17 and 18 and described above, in one embodiment, the association between sidelink service and SL DRX configuration could be preconfigured or predefined in the first UE and the second UE or is provisioned by network. The first UE or the second UE could select an entry of a list of the association between sidelink service and SL DRX configuration, and the entry could include the SL DRX configuration and an identity of the sidelink service or an index associated with the sidelink service. The SL DRX configuration could configure at least one of an on-duration timer (e.g. drx-onDurationTimerSL) used for determining a duration at the beginning of a SL DRX cycle, an inactive timer (e.g. drx-InactivityTimerSL) used for determining a duration after a PSCCH occasion in which a sidelink control information indicates a sidelink transmission, a retransmission timer (e.g. drx-RetransmissionTimerSL) used for determining a maximum duration until a sidelink retransmission is received, a cycle length (e.g. drx-LongCycleStartOffsetSL) used for determining a length of the SL DRX cycle, a short cycle length (e.g. drx-ShortCycleSL) used for determining a length of a second SL DRX cycle shorter than the length of the SL DRX cycle, and/or a round trip-time timer (e.g. drx-HARQ-RTT-TimerSL) used for determining a maximum duration before a sidelink HARQ retransmission grant is expected.

In one embodiment, the first UE and the second UE may belong to a group for the sidelink groupcast communication. The identifier associated with the group or the groupcast sidelink communication may be a (part of) groupcast destination Layer-2 ID or a group ID.

FIG. 18 is a flow chart 1800 illustrating a method for a (Rx) UE. In step 1805, the (Rx) UE initializes a sidelink service for a sidelink groupcast communication. In step 1810, the (Rx) UE receives an identifier (ID) associated with the sidelink groupcast communication, wherein the ID is used for data transmission and reception in the sidelink groupcast communication. In step 1815, the (Rx) UE receives a SL DRX configuration associated with the sidelink service, wherein the SL DRX configuration includes at least a first length of on-duration and a second length of a cycle. In step 1820, the (Rx) UE derives or determines an offset based on at least the identifier. In step 1825, the (Rx) UE determines a periodic active time based on at least the first length of on-duration, the second length of the cycle and the offset, wherein the offset is used to indicate or define where the cycle starts and the first length of on-duration is a duration at beginning of the cycle. In step 1830, the (Rx) UE monitors sidelink control channel within the periodic active time for the sidelink groupcast communication.

Referring back to FIGS. 3 and 4, in one exemplary embodiment of a method for a (Rx) UE, the (Rx) UE 300 includes a program code 312 stored in the memory 310. The CPU 308 could execute program code 312 to enable the (Rx) UE (i) to initialize a sidelink service for a sidelink groupcast communication, (ii) to receive an identifier (ID) associated with the sidelink groupcast communication, wherein the ID is used for data transmission and reception in the sidelink groupcast communication, (iii) to receive a SL DRX configuration associated with the sidelink service, wherein the SL DRX configuration includes at least a first length of on-duration and a second length of a cycle, (iv) to derive or determine an offset based on at least the identifier, (v) to determine a periodic active time based on at least the first length of on-duration, the second length of the cycle and the offset, wherein the offset is used to indicate or define where the cycle starts and the first length of on-duration is a duration at beginning of the cycle, and (vi) to monitor sidelink control channel within the periodic active time for the sidelink groupcast communication. Furthermore, the CPU 308 can execute the program code 312 to perform all of the above-described actions and steps or others described herein.

Figure 19:
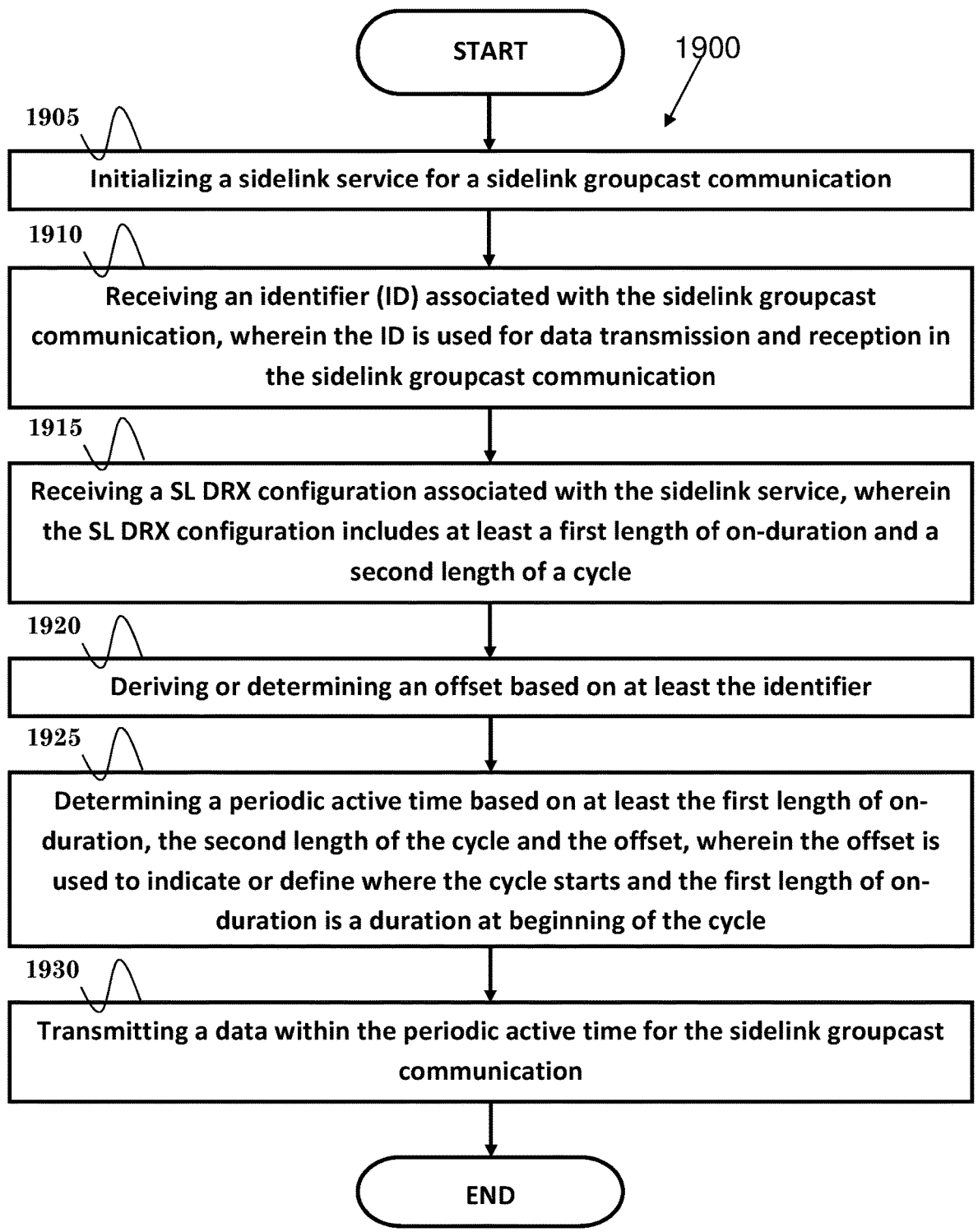
FIG. 19 is a flow chart according to one exemplary embodiment.

FIG. 19 is a flow chart 1900 illustrating a method for a (Tx) UE. In step 1905, the (Tx) UE initializes a sidelink service for a sidelink groupcast communication. In step 1910, the (Tx) UE receives an identifier (ID) associated with the sidelink groupcast communication, wherein the ID is used for data transmission and reception in the sidelink groupcast communication. In step 1915, the (Tx) UE receives a SL DRX configuration associated with the sidelink service, wherein the SL DRX configuration includes at least a first length of on-duration and a second length of a cycle. In step 1920, the (Tx) UE derives or determines an offset based on at least the identifier. In step 1925, the (Tx) UE determines a periodic active time based on at least the first length of on-duration, the second length of the cycle and the offset, wherein the offset is used to indicate or define where the cycle starts and the first length of on-duration is a duration at beginning of the cycle. In step 1930, the (Tx) UE transmits a data within the periodic active time for the sidelink groupcast communication.

Referring back to FIGS. 3 and 4, in one exemplary embodiment of a method for a (Tx) UE, the (Tx) UE 300 includes a program code 312 stored in the memory 310. The CPU 308 could execute program code 312 to enable the (Tx) UE (i) to initialize a sidelink service for a sidelink groupcast communication, (ii) to receive an identifier (ID) associated with the sidelink groupcast communication, wherein the ID is used for data transmission and reception in the sidelink groupcast communication, (iii) to receive a SL DRX configuration associated with the sidelink service, wherein the SL DRX configuration includes at least a first length of on-duration and a second length of a cycle, (iv) to derive or determine an offset based on at least the identifier, (v) to determine a periodic active time based on at least the first length of on-duration, the second length of the cycle and the offset, wherein the offset is used to indicate or define where the cycle starts and the first length of on-duration is a duration at beginning of the cycle, and (vi) to transmit a data within the periodic active time for the sidelink groupcast communication. Furthermore, the CPU 308 can execute the program code 312 to perform all of the above-described actions and steps or others described herein.

In general, UE1 may have to transmit sidelink packets to UE2 at the period or time duration on which UE2 is awake for receiving these sidelink packets. Otherwise, these sidelink packets may be lost at UE2 if UE1 transmits these sidelink packets when UE2 is on the "sleep" period. According to one alternative (discussed in 3GPP TS 23.776 V2.0.0), one or more PC5 Quality of Service (QoS) flows of each sidelink service could be associated with one sidelink DRX configuration. The association between PC5 QoS flow and sidelink DRX configuration could be pre-defined or pre-configured in UE or provisioned by network through authorization procedure. The association between PC5 QoS flow and sidelink DRX configuration could be applicable for unicast sidelink communication, broadcast sidelink communication and/or groupcast sidelink communication. For example, UE1 could initialize a sidelink service toward UE2 and establishes a unicast link with UE2. As another example, UE1 and UE2 could perform a sidelink service which will initialize groupcast sidelink communication. Thus, UE1 and UE2 could form a group for the groupcast sidelink communication. For example, UE1 and UE2 could perform a sidelink service which will initialize broadcast sidelink communication.

Figure 15:
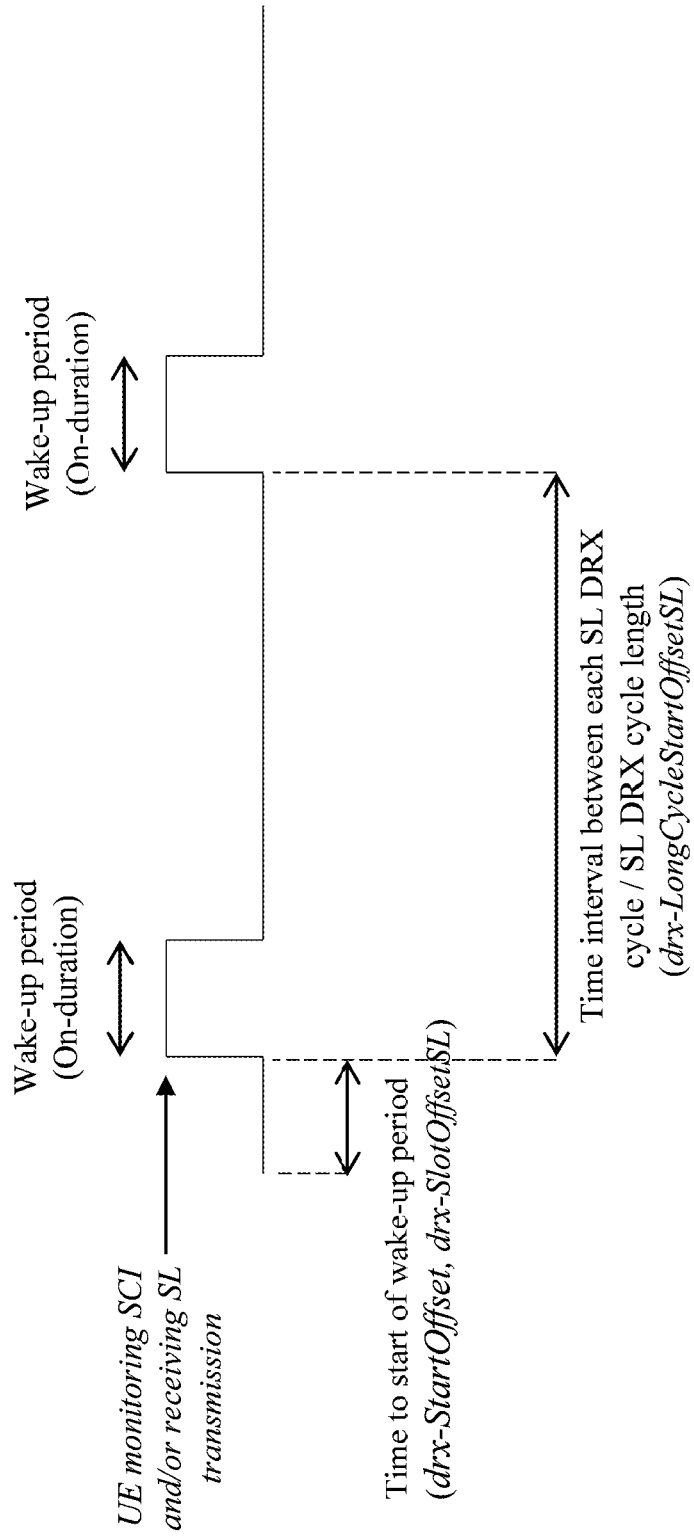
FIG. 15 is a flow chart according to one exemplary embodiment.

According to the sidelink DRX configuration for a given PC5 QoS flow of the sidelink service, UE1 may know how long UE2 stays awake after waking up (i.e. on-duration in each cycle of sidelink DRX) and the time interval between each wake-up period (i.e. cycle length of sidelink DRX). More specifically, the sidelink DRX configuration (i.e. the on-duration in each cycle of sidelink DRX, and the cycle length of sidelink DRX) may be determined or derived based on traffic pattern of the given PC5 QoS flow. This could be illustrated in FIG. 15. However, UE1 may have no information about time to start such wake-up period of the sidelink DRX configuration (i.e. startOffset for starting each cycle of sidelink DRX and/or slotOffset for starting on duration of each sidelink DRX cycle), so that UE1 may send sidelink control information and/or sidelink transmission to UE2 at wrong time. Similarly, UE2 may also have no the information about time to start such wake-up period of the sidelink DRX configuration, so that UE2 may monitor sidelink control information and/or receive sidelink transmission from UE1 at wrong time. To address this problem, some methods to determine when to start a wake-up period of a sidelink DRX configuration could be considered.

Since each member in the group knows/acquires the same V2X layer ID/value or the same application layer ID/value associated with the group, each member in the group will then derive or determine or apply the same time to start the wake-up period of the sidelink DRX configuration associated with the group. In one embodiment, for a sidelink group comprising at least a UE1 and a UE2, UE1 could derive or determine a time to start a wake-up period of a sidelink DRX configuration for the sidelink group based on group ID or destination L2ID associated with the group. UE1 could perform sidelink transmission to the sidelink group (e.g., to other UEs within the sidelink group) based on or within the wake-up period. UE2 could perform sidelink reception from the sidelink group (e.g., from other UEs within the sidelink group) based on or within the wake-up period. Similarly, for broadcast, each sidelink service using broadcast sidelink communication could be associated with one broadcast destination L2 ID. Every UE could initiate the sidelink service using the broadcast sidelink communication could use the same broadcast destination L2ID for sidelink reception. Thus, the concept discussed above could be also applied such that UE could derive or determine a time to start a wake-up period of a sidelink DRX configuration for a broadcast sidelink communication based on a broadcast destination L2ID associated with the broadcast sidelink communication.

Moreover, it could be separate wake-up periods for different groups and/or different UEs in use of broadcast sidelink communication at different timing, so that it would reduce resource collisions in case these sidelink transmissions occur at the same wake-up period across all these UEs. This benefit could be also applicable to sidelink unicast communication.

More specifically, the association between PC5 QoS flow and sidelink DRX configuration could be that an identity of a PC5 QoS flow (e.g. QFI) or an identity used for identifying a PC5 QoS requirement (e.g. PQI) of the sidelink service is associated with one sidelink DRX configuration.

Alternatively, the time to start a wake-up period of a sidelink DRX configuration could be specified or pre-configured in the UE. In other words, the time to start a wake-up period of a sidelink DRX configuration may not be provided in or derived from the sidelink DRX configuration. In this alternative, the time to start a wake-up period of a sidelink DRX configuration could be specified or pre-configured as e.g. value '0' or a specific value. In this alternative, the UE could apply or use the sidelink DRX configuration configured in system information broadcasted by the base station or a dedicated signalling sent to the UE from the base station or negotiated with the peer UE, and could derive or determine the time to start a wake-up period of the sidelink DRX configuration based on the specified or pre-configured value.

Figure 20:
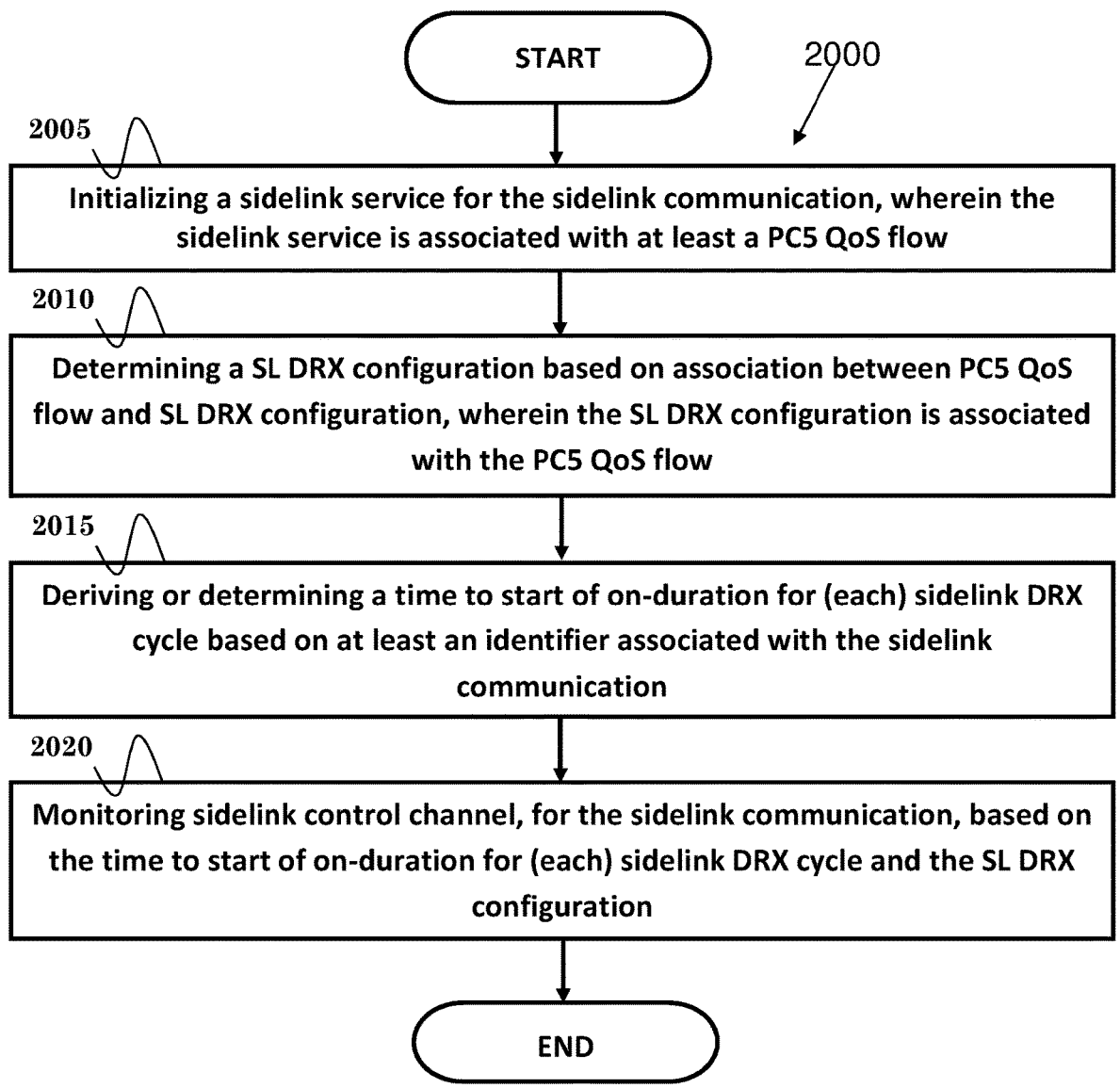
FIG. 20 is a flow chart according to one exemplary embodiment.

FIG. 20 is a flow chart 2000 illustrating a method for a second UE to configure SL DRX in a sidelink communication. In step 2005, the second UE initializes a sidelink service for the sidelink communication, wherein the sidelink service is associated with at least a PC5 QoS flow. In step 2010, the second UE determines a SL DRX configuration based on association between PC5 QoS flow and SL DRX configuration, wherein the SL DRX configuration is associated with the PC5 QoS flow. In step 2015, the second UE derives or determines a time to start of on-duration for (each) sidelink DRX cycle based on at least an identifier associated with the sidelink communication. In step 2020, the second UE monitors sidelink control channel, for the sidelink communication, based on the time to start of on-duration for (each) sidelink DRX cycle and the SL DRX configuration.

Referring back to FIGS. 3 and 4, in one exemplary embodiment of a method for a second UE to configure SL DRX in a sidelink communication, the second UE 300 includes a program code 312 stored in the memory 310. The CPU 308 could execute program code 312 to enable the second UE (i) to initialize a sidelink service for the sidelink communication, wherein the sidelink service is associated with at least a PC5 QoS flow, (ii) to determine a SL DRX configuration based on association between PC5 QoS flow and SL DRX configuration, wherein the SL DRX configuration is associated with the PC5 QoS flow, (iii) to derive or determine a time to start of on-duration for (each) sidelink DRX cycle based on at least an identifier associated with the sidelink communication, and (iv) to monitor sidelink control channel, for the sidelink communication, based on the time to start of on-duration for (each) sidelink DRX cycle and the SL DRX configuration. Furthermore, the CPU 308 can execute the program code 312 to perform all of the above-described actions and steps or others described herein.

Figure 21:
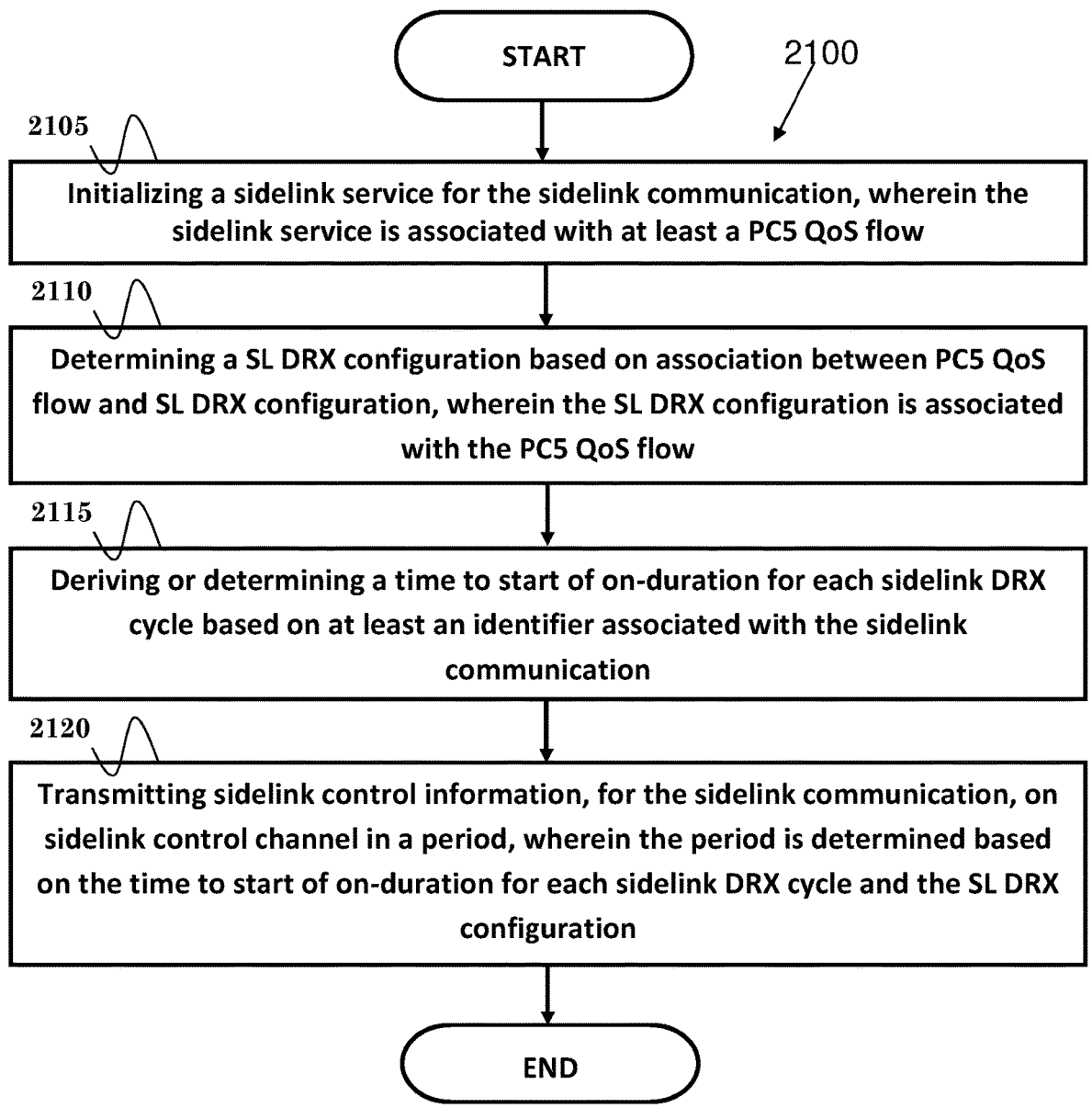
FIG. 21 is a flow chart according to one exemplary embodiment.

FIG. 21 is a flow chart 2100 illustrating a method for a first UE to consider SL DRX in a sidelink communication. In step 2105, the first UE initializes a sidelink service for the sidelink communication, wherein the sidelink service is associated with at least a PC5 QoS flow. In step 2110, the first UE determines a SL DRX configuration based on association between PC5 QoS flow and SL DRX configuration, wherein the SL DRX configuration is associated with the PC5 QoS flow. In step 2115, the first UE derives or determines a time to start of on-duration for each sidelink DRX cycle based on at least an identifier associated with the sidelink communication. In step 2120, the first UE transmits sidelink control information, for the sidelink communication, on sidelink control channel in a period, wherein the period is determined based on the time to start of on-duration for each sidelink DRX cycle and the SL DRX configuration.

Referring back to FIGS. 3 and 4, in one exemplary embodiment of a method for a first UE to configure SL DRX for sidelink groupcast communication, the first UE 300 includes a program code 312 stored in the memory 310. The CPU 308 could execute program code 312 to enable the first UE (i) to initialize a sidelink service for the sidelink communication, wherein the sidelink service is associated with at least a PC5 QoS flow, (ii) to determine a SL DRX configuration based on association between PC5 QoS flow and SL DRX configuration, wherein the SL DRX configuration is associated with the PC5 QoS flow, (iii) to derive or determine a time to start of on-duration for each sidelink DRX cycle based on at least an identifier associated with the sidelink communication, and (iv) to transmit sidelink control information, for the sidelink communication, on sidelink control channel in a period, wherein the period is determined based on the time to start of on-duration for each sidelink DRX cycle and the SL DRX configuration. Furthermore, the CPU 308 can execute the program code 312 to perform all of the above-described actions and steps or others described herein.

In the context of the embodiments shown in FIGS. 20 and 21 and described above, in one embodiment, the association between PC5 QoS flow and SL DRX configuration could be preconfigured or predefined in the first UE and the second UE or is provisioned by network. The first UE or the second UE could select an entry of a list of the association between PC5 QoS flow and SL DRX configuration, and the entry could include the SL DRX configuration and an identity of the PC5 QoS flow or an index associated with the PC5 QoS flow.

In one embodiment, the SL DRX configuration could configure at least one of an on-duration timer (e.g. drx-onDurationTimerSL) used for determining a duration at the beginning of a SL DRX cycle, an inactive timer (e.g. drx-InactivityTimerSL) used for determining a duration after a PSCCH occasion in which a sidelink control information indicates a sidelink transmission, a retransmission timer (e.g. drx-RetransmissionTimerSL) used for determining a maximum duration until a sidelink retransmission is received, a cycle length (e.g. drx-LongCycleStartOffsetSL) used for determining a length of the SL DRX cycle, a short cycle length (e.g. drx-ShortCycleSL) used for determining a length of a second SL DRX cycle shorter than the length of the SL DRX cycle, and/or a round trip-time timer (e.g. drx-HARQ-RTT-TimerSL) used for determining a maximum duration before a sidelink HARQ retransmission grant is expected.

In one embodiment, the sidelink communication may be a groupcast sidelink communication, and the first UE and the second UE may belong to a group for the groupcast sidelink communication. The identifier associated with the group or the groupcast sidelink communication may be a (part of) groupcast destination Layer-2 ID or a group ID. The sidelink communication may be a broadcast sidelink communication, and the first UE and the second UE could initiate the sidelink service for the broadcast sidelink communication. The identifier associated with the broadcast sidelink communication may be a (part of) broadcast destination Layer-2 ID associated with the sidelink service.

Figure 22:
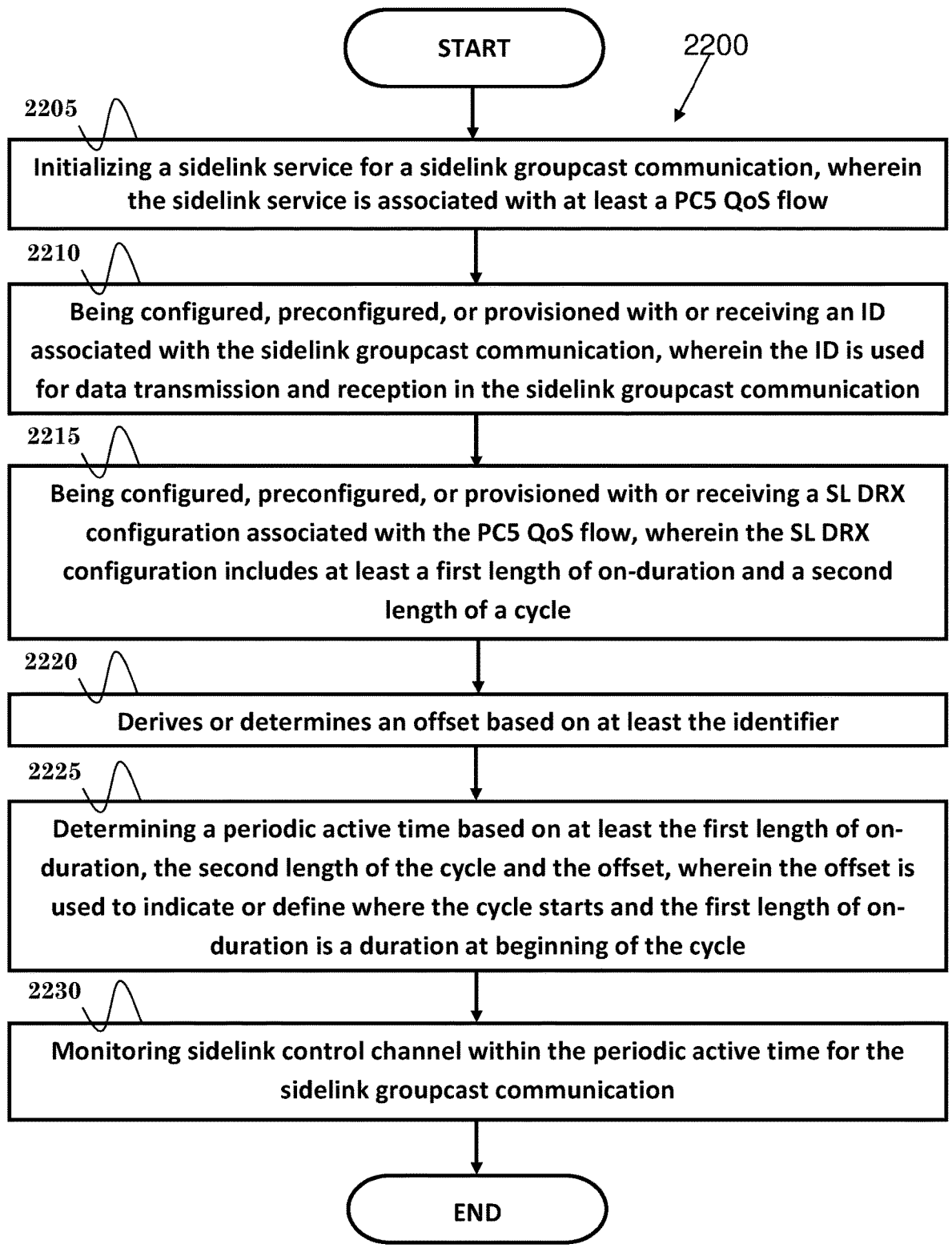
FIG. 22 is a flow chart according to one exemplary embodiment.

FIG. 22 is a flow chart 2200 illustrating a method for a (Rx) UE. In step 2205, the (Rx) UE initializes a sidelink service for a sidelink groupcast communication, wherein the sidelink service is associated with at least a PC5 QoS flow. In step 2210, the (Rx) UE is being configured, preconfigured, or provisioned with or receiving an ID associated with the sidelink groupcast communication, wherein the ID is used for data transmission and reception in the sidelink groupcast communication. In step 2215, the (Rx) UE is being configured, preconfigured, or provisioned with or receiving a SL DRX configuration associated with the PC5 QoS flow, wherein the SL DRX configuration includes at least a first length of on-duration and a second length of a cycle. In step 2220, the (Rx) UE derives or determines an offset based on at least the identifier. In step 2225, the (Rx) UE determines a periodic active time based on at least the first length of on-duration, the second length of the cycle and the offset, wherein the offset is used to indicate/define where the cycle starts and the first length of on-duration is a duration at beginning of the cycle. In step 2230, the (Rx) UE monitors sidelink control channel within the periodic active time for the sidelink groupcast communication.

Referring back to FIGS. 3 and 4, in one exemplary embodiment of a method for a (Rx) UE, the (Rx) UE 300 includes a program code 312 stored in the memory 310. The CPU 308 could execute program code 312 to enable the (Rx) UE (i) to initialize a sidelink service for a sidelink groupcast communication, wherein the sidelink service is associated with at least a PC5 QoS flow, (ii) to be configured, preconfigured, or provisioned with or receiving an ID associated with the sidelink groupcast communication, wherein the ID is used for data transmission and reception in the sidelink groupcast communication, (iii) to be configured, preconfigured, or provisioned with or receiving a SL DRX configuration associated with the PC5 QoS flow, wherein the SL DRX configuration includes at least a first length of on-duration and a second length of a cycle, (iv) to derive or determine an offset based on at least the identifier, (v) to determine a periodic active time based on at least the first length of on-duration, the second length of the cycle and the offset, wherein the offset is used to indicate or define where the cycle starts and the first length of on-duration is a duration at beginning of the cycle, and (vi) to monitor sidelink control channel within the periodic active time for the sidelink groupcast communication. Furthermore, the CPU 308 can execute the program code 312 to perform all of the above-described actions and steps or others described herein.

Figure 23:
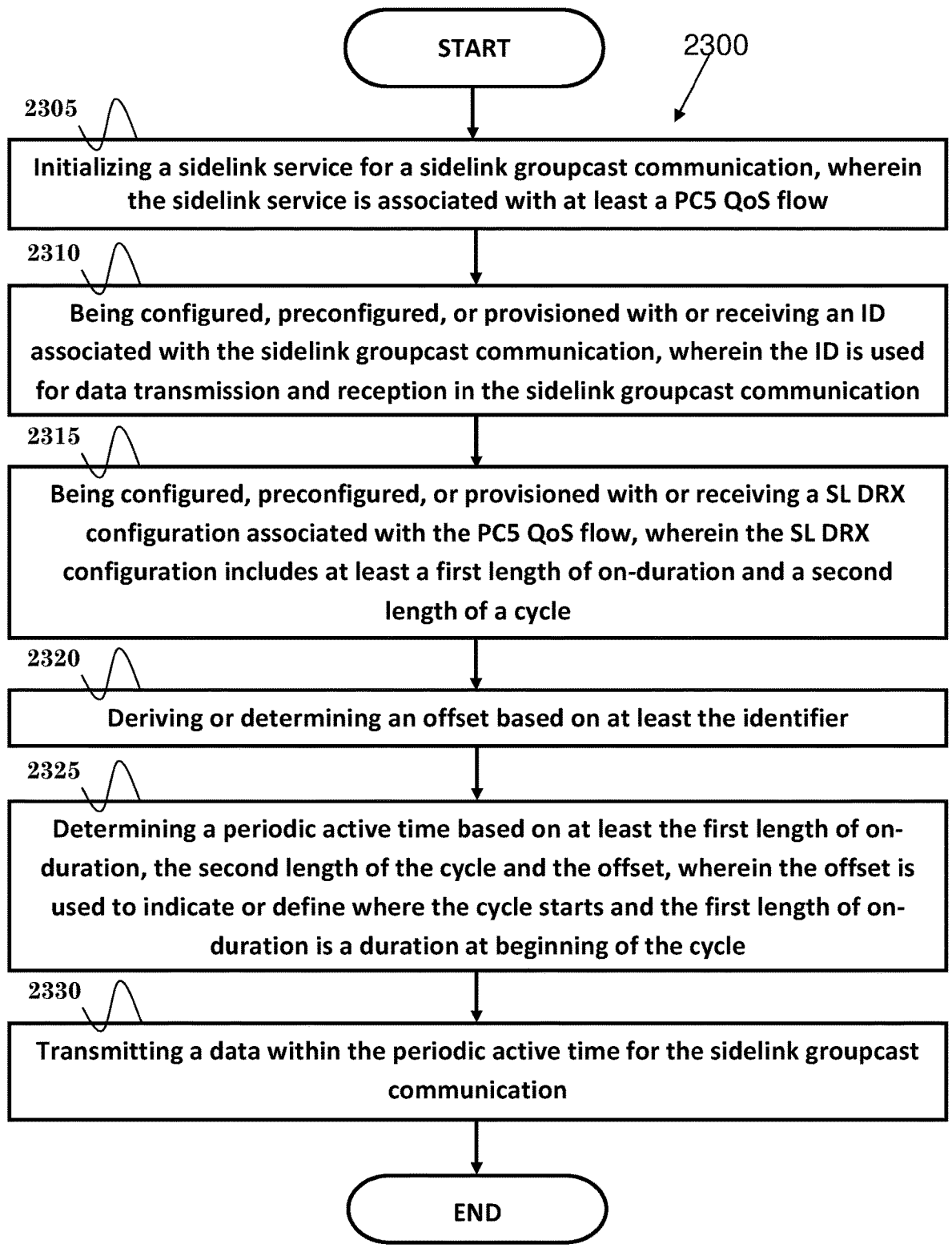
FIG. 23 is a flow chart according to one exemplary embodiment.

FIG. 23 is a flow chart 2300 illustrating a method for a (Tx) UE. In step 2305, the (Tx) UE initializes a sidelink service for a sidelink groupcast communication, wherein the sidelink service is associated with at least a PC5 QoS flow. In step 2310, the (Tx) UE is being configured, preconfigured, or provisioned with or receiving an ID associated with the sidelink groupcast communication, wherein the ID is used for data transmission and reception in the sidelink groupcast communication. In step 2315, the (Tx) UE is being configured, preconfigured, or provisioned with or receiving a SL DRX configuration associated with the PC5 QoS flow, wherein the SL DRX configuration includes at least a first length of on-duration and a second length of a cycle. In step 2320, the (Tx) UE derives or determines an offset based on at least the identifier. In step 2325, the (Tx) UE determines a periodic active time based on at least the first length of on-duration, the second length of the cycle and the offset, wherein the offset is used to indicate or define where the cycle starts and the first length of on-duration is a duration at beginning of the cycle. In step 2330, the (Tx) UE transmits a data within the periodic active time for the sidelink groupcast communication.

Referring back to FIGS. 3 and 4, in one exemplary embodiment of a method for a (Tx) UE, the (Tx) UE 300 includes a program code 312 stored in the memory 310. The CPU 308 could execute program code 312 to enable the (Tx) UE (i) to initialize a sidelink service for a sidelink groupcast communication, wherein the sidelink service is associated with at least a PC5 QoS flow, (ii) to be configured, preconfigured, or provisioned with or receiving an ID associated with the sidelink groupcast communication, wherein the ID is used for data transmission and reception in the sidelink groupcast communication, (iii) to be configured, preconfigured, or provisioned with or receiving a SL DRX configuration associated with the PC5 QoS flow, wherein the SL DRX configuration includes at least a first length of on-duration and a second length of a cycle, (iv) to derive or determine an offset based on at least the identifier, (v) to determine a periodic active time based on at least the first length of on-duration, the second length of the cycle and the offset, wherein the offset is used to indicate or define where the cycle starts and the first length of on-duration is a duration at beginning of the cycle, and (vi) to transmit a data within the periodic active time for the sidelink groupcast communication. Furthermore, the CPU 308 can execute the program code 312 to perform all of the above-described actions and steps or others described herein.

It is possible that each PC5 5QI (PQI) could be associated with one or more SL DRX configuration. In one embodiment (for the one or more SL DRX configurations associated with one PQI), one SL DRX configuration could include one value about time/time-offset to start a wake-up period of SL DRX. Different SL DRX configurations may include respective (may be the same or different) value about time or time-offset to start a wake-up period of SL DRX. Different SL DRX configurations may include respective (may be the same or different) DRX cycle length or on-duration period length. Therefore, UE initiating a service of interest may select, pick, or derive (to apply) a SL DRX configuration according to a PQI of the service.

For example, the SL DRX configuration could include a set of parameters used for determining a pattern of a SL DRX (containing e.g. a DRX cycle length and/or on-duration period) and one parameter used for determining time or time-offset to start wake-up time of the SL DRX. The parameter used for determining time or time-offset to start wake-up time of SL DRX could include e.g. startOffset and/or slotOffset. Each of the one or more SL DRX configurations could be associated with one index. UE could use, for example, groupcast destination L2ID, a group ID, a V2X layer ID or a L2ID associated with the service to determine or derive (a value indicating) an index for a SL DRX configuration.

For example, a SL DRX configuration including a first set of startOffset and/or slotOffset may be associated with Index 1, a SL DRX configuration including a second set of startOffset and/or slotOffset may be associated with Index 2, and a SL DRX configuration including a third set of startOffset and/or slotOffset may be associated with Index 3. If the UE could initiate a broadcast or groupcast service of interest, the UE could use a L2ID associated with the broadcast or groupcast service or a V2X layer ID or a group ID associated with the groupcast service to determine or derive (a value indicating) an index.

For example, if the determined or derived Index is 3 or the determined or derived value indicates the Index 3, this UE could apply parameters startOffset and/or slotOffset in the SL DRX configuration associated with Index 3. This UE could apply parameters startOffset and/or slotOffset in the third set of startOffset and/or slotOffset for determining the time or time-offset to start wake-up period of a SL DRX of the SL DRX configuration corresponding to a PQI of the broadcast or groupcast service.

In one embodiment (for the one or more SL DRX configurations associated with one PQI), each SL DRX configuration could include one or more values about time or time-offset to start a wake-up period of SL DRX. Therefore, the UE initiating a service of interest may apply a SL DRX configuration according to a PQI of the service, and may select, pick, or derive a value from the one or more values for determining a time or time-offset to start wake-up period of SL DRX for this SL DRX configuration.

For example, the SL DRX configuration could include a set of parameters used for determining a pattern of a SL DRX (containing e.g. a DRX cycle length and/or on-duration period) and one or more (sets of) parameters used for determining time or time-offset to start wake-up time of the SL DRX. Each (set of) parameters used for determining time or time-offset to start wake-up time of SL DRX could include, for example, startOffset and/or slotOffset. Each (set of) parameters used for determining time to start wake-up time of SL DRX could be associated with one index. The UE could use, for example, groupcast destination L2ID, a group ID, a V2X layer ID or a L2ID associated with the service to determine or derive which (set of) parameters used for determining time or time-offset to start wake-up time of SL DRX should be used for the SL DRX. For example, the SL DRX configuration could include a first set of startOffset and/or slotOffset associated with Index 1, a second set of startOffset and/or slotOffset associated with Index 2, and a third set of startOffset and/or slotOffset associated with Index 3.

If the UE could initiate a broadcast or groupcast service of interest, the UE could use a L2ID associated with the broadcast or groupcast service to determine or derive (a value indicating) an index. For example, if the determined or derived Index is 3 or the determined or derived value indicates the Index 3, this UE could apply parameters startOffset and/or slotOffset in the third set of startOffset and/or slotOffset for determining the time or time-offset to start wake-up period of a SL DRX of a SL DRX configuration corresponding to a PQI of the broadcast or groupcast service.

If the UE could initiate a groupcast service of interest, the UE could use a V2X layer ID or a group ID associated with the groupcast service to determine or derive (a value indicating) an index. For example, if the determined or derived Index is 1 or the determined or derived value indicates the Index 1, this UE could apply parameters startOffset and/or slotOffset in the first set of startOffset and/or slotOffset for determining the time/time-offset to start wake-up period of the SL DRX configuration corresponding to a PQI of the groupcast service.

For example, in the aforementioned ID (e.g. L2ID, V2X layer ID, destination ID of the group, group ID associated with the groupcast service) could be X, and the number of parameter sets could be N (e.g. index of parameter sets is from 0 to N−1). All UEs in this group or initiating the same (unicast, broadcast or groupcast) service could use the same SL DRX configuration or parameter set with index=(X mod N). Alternatively, all UEs in this group or initiating the same (unicast, broadcast or groupcast) service could use the same SL DRX configuration or parameter set with index=((X+m) mod N), where m may be other value, e.g. a (pre)configured or specified value, or a value associated with group member number, or a value or ID associated with a scheduling UE.

Figure 24:
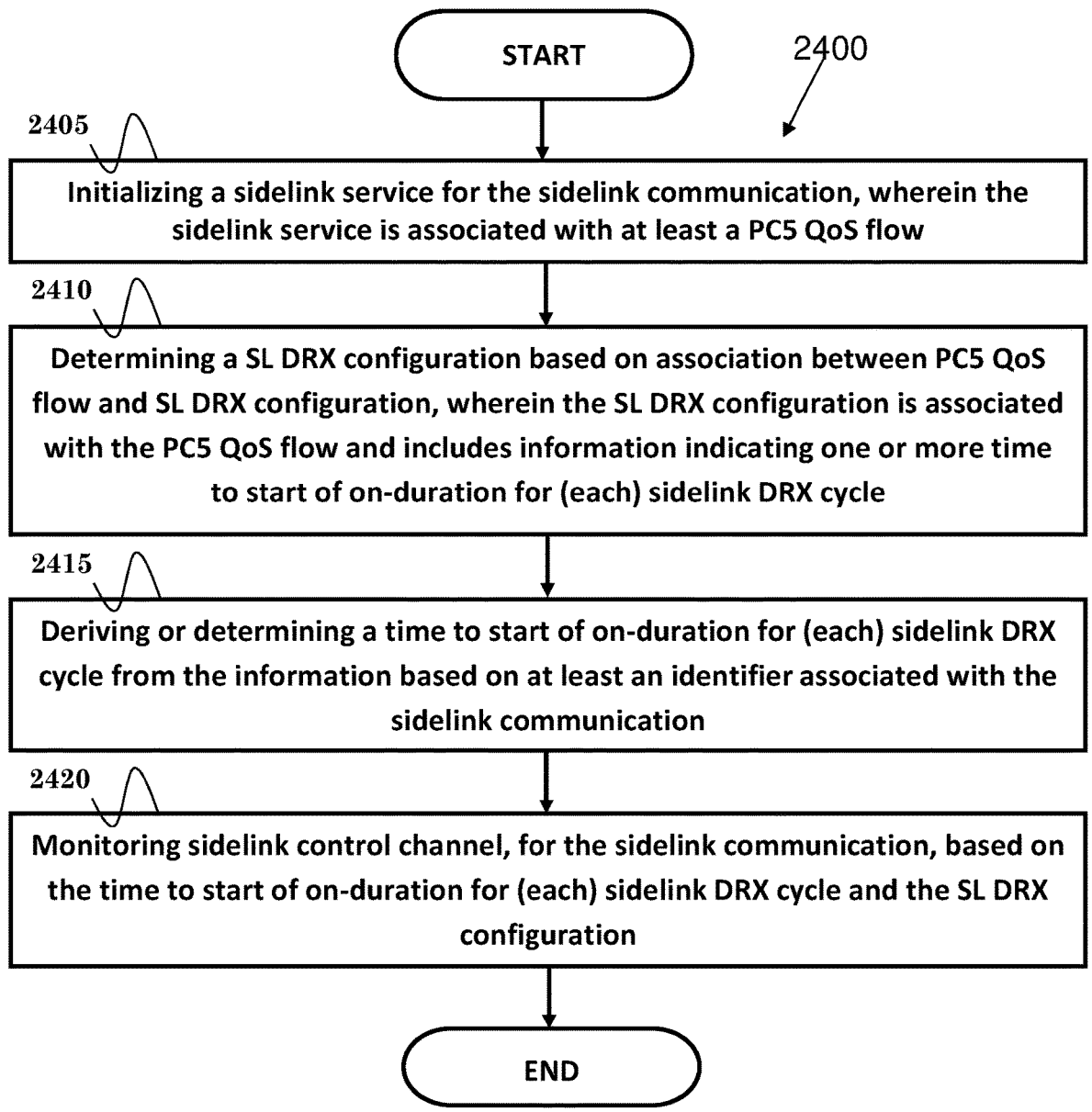
FIG. 24 is a flow chart according to one exemplary embodiment.

FIG. 24 is a flow chart 2400 illustrating a method for a second UE to configure SL DRX in a sidelink communication. In step 2405, the second UE initializes a sidelink service for the sidelink communication, wherein the sidelink service is associated with at least a PC5 QoS flow. In step 2410, the second UE determines a SL DRX configuration based on association between PC5 QoS flow and SL DRX configuration, wherein the SL DRX configuration is associated with the PC5 QoS flow and includes information indicating one or more time to start of on-duration for (each) sidelink DRX cycle. In step 2415, the second UE derives or determines a time to start of on-duration for (each) sidelink DRX cycle from the information based on at least an identifier associated with the sidelink communication. In step 2420, the second UE monitors sidelink control channel, for the sidelink communication, based on the time to start of on-duration for (each) sidelink DRX cycle and the SL DRX configuration.

Referring back to FIGS. 3 and 4, in one exemplary embodiment of a method for a second UE to configure SL DRX in a sidelink communication, the second UE 300 includes a program code 312 stored in the memory 310. The CPU 308 could execute program code 312 to enable the second UE (i) to initialize a sidelink service for the sidelink communication, wherein the sidelink service is associated with at least a PC5 QoS flow, (ii) to determine a SL DRX configuration based on association between PC5 QoS flow and SL DRX configuration, wherein the SL DRX configuration is associated with the PC5 QoS flow and includes information indicating one or more time to start of on-duration for (each) sidelink DRX cycle, (iii) to derive or determine a time to start of on-duration for (each) sidelink DRX cycle from the information based on at least an identifier associated with the sidelink communication, and (iv) to monitor sidelink control channel, for the sidelink communication, based on the time to start of on-duration for (each) sidelink DRX cycle and the SL DRX configuration. Furthermore, the CPU 308 can execute the program code 312 to perform all of the above-described actions and steps or others described herein.

Figure 25:
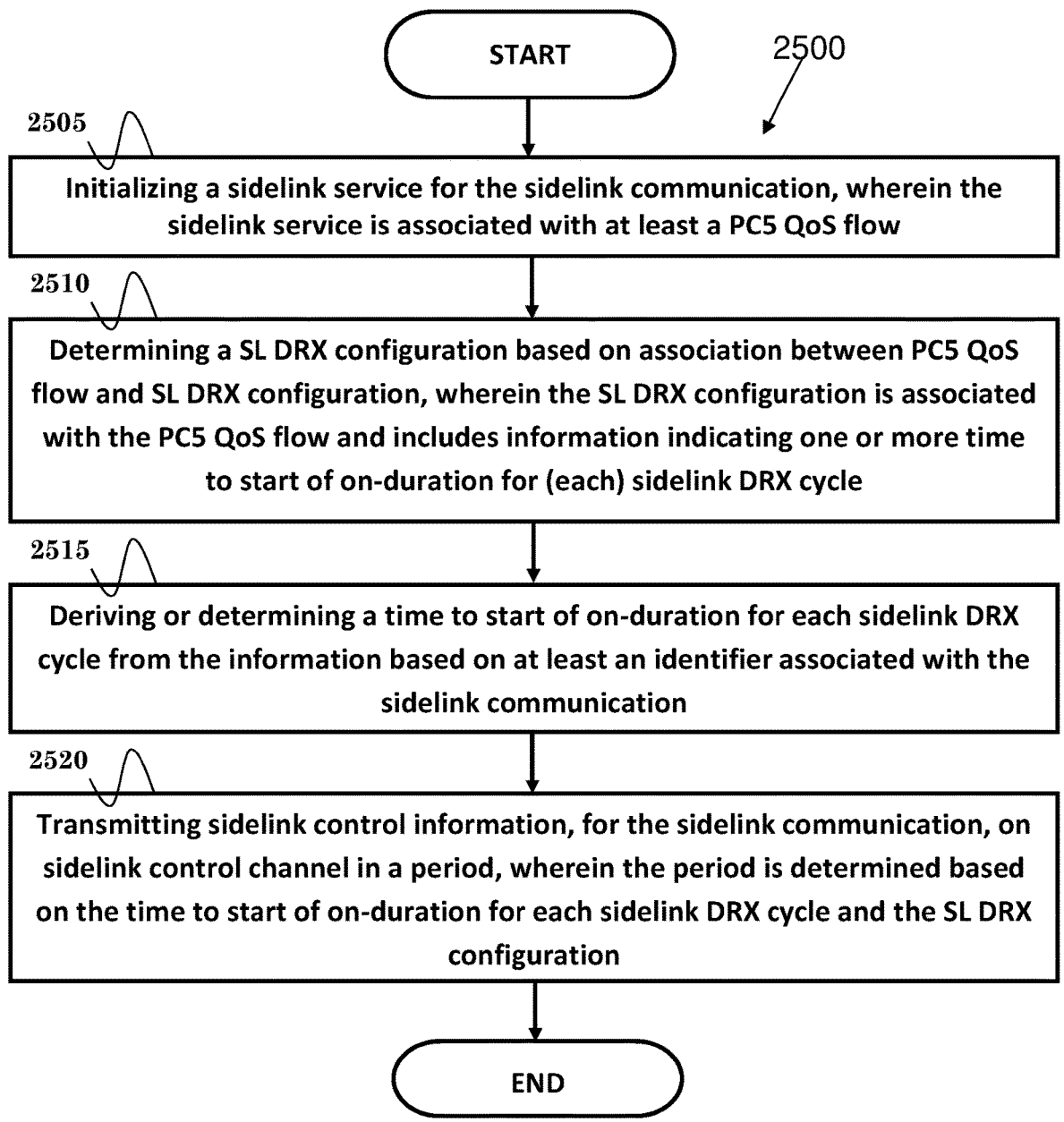
FIG. 25 is a flow chart according to one exemplary embodiment.

FIG. 25 is a flow chart 2500 illustrating a method for a first UE to consider SL DRX in a sidelink communication. In step 2505, the first UE initializes a sidelink service for the sidelink communication, wherein the sidelink service is associated with at least a PC5 QoS flow. In step 2510, the first UE determines a SL DRX configuration based on association between PC5 QoS flow and SL DRX configuration, wherein the SL DRX configuration is associated with the PC5 QoS flow and includes information indicating one or more time to start of on-duration for (each) sidelink DRX cycle. In step 2515, the first UE derives or determines a time to start of on-duration for each sidelink DRX cycle from the information based on at least an identifier associated with the sidelink communication. In step 2520, the first UE transmits sidelink control information, for the sidelink communication, on sidelink control channel in a period, wherein the period is determined based on the time to start of on-duration for each sidelink DRX cycle and the SL DRX configuration.

Referring back to FIGS. 3 and 4, in one exemplary embodiment of a method for a first UE to consider SL DRX in a sidelink communication, the first UE 300 includes a program code 312 stored in the memory 310. The CPU 308 could execute program code 312 to enable the first UE (i) to initialize a sidelink service for the sidelink communication, wherein the sidelink service is associated with at least a PC5 QoS flow, (ii) to determine a SL DRX configuration based on association between PC5 QoS flow and SL DRX configuration, wherein the SL DRX configuration is associated with the PC5 QoS flow and includes information indicating one or more time to start of on-duration for (each) sidelink DRX cycle, (iii) to derive or determine a time to start of on-duration for each sidelink DRX cycle from the information based on at least an identifier associated with the sidelink communication, and (iv) to transmit sidelink control information, for the sidelink communication, on sidelink control channel in a period, wherein the period is determined based on the time to start of on-duration for each sidelink DRX cycle and the SL DRX configuration. Furthermore, the CPU 308 can execute the program code 312 to perform all of the above-described actions and steps or others described herein.

In the context of the embodiments shown in FIGS. 24 and 25 and described above, in one embodiment, the association between PC5 QoS flow and SL DRX configuration could be preconfigured or predefined in the first UE and the second UE or is provisioned by network. The first UE or the second UE could select an entry of a list of the association between PC5 QoS flow and SL DRX configuration, and the entry could include the SL DRX configuration and a PQI associated with the PC5 QoS flow, an identity of the PC5 QoS flow or an index associated with the PC5 QoS flow.

In one embodiment, the SL DRX configuration could configure at least one of an on-duration timer (e.g. drx-onDurationTimerSL) used for determining a duration at the beginning of a SL DRX cycle, an inactive timer (e.g. drx-InactivityTimerSL) used for determining a duration after a PSCCH occasion in which a sidelink control information indicates a sidelink transmission, a retransmission timer (e.g. drx-RetransmissionTimerSL) used for determining a maximum duration until a sidelink retransmission is received, a cycle length (e.g. drx-LongCycleStartOffsetSL) used for determining a length of the SL DRX cycle, a short cycle length (e.g. drx-ShortCycleSL) used for determining a length of a second SL DRX cycle shorter than the length of the SL DRX cycle, and/or a round trip-time timer (e.g. drx-HARQ-RTT-TimerSL) used for determining a maximum duration before a sidelink HARQ retransmission grant is expected.

In one embodiment, the sidelink communication may be a groupcast sidelink communication, and the first UE and the second UE may belong to a group for the groupcast sidelink groupcast communication. The identifier associated with the group or the groupcast sidelink communication may be a (part of) groupcast destination Layer-2 ID or a group ID. The sidelink communication may be a broadcast sidelink communication, and the first UE and the second UE could initiate the sidelink service for the broadcast sidelink communication.

In one embodiment, the identifier associated with the broadcast sidelink communication may be a (part of) broadcast destination Layer-2 ID associated with the sidelink service. The information may include at least one drx-SlotOffset for determining one time to start of on-duration for (each) sidelink DRX cycle and each drx-SlotOffset is associated with one index. The information may also include at least one drx-StartOffset for determining one time to start of on-duration for (each) sidelink DRX cycle and each drx-StartOffset is associated with one index.

In one embodiment, the first or second UE could use the identifier associated with the sidelink communication to determine or derive an index of a drx-SlotOffset and/or a drx-StartOffset in the information. The first or second UE could use the drx-SlotOffset and/or the drx-StartOffset to derive or determine the time to start of on-duration for (each) sidelink DRX cycle.

Figure 26:
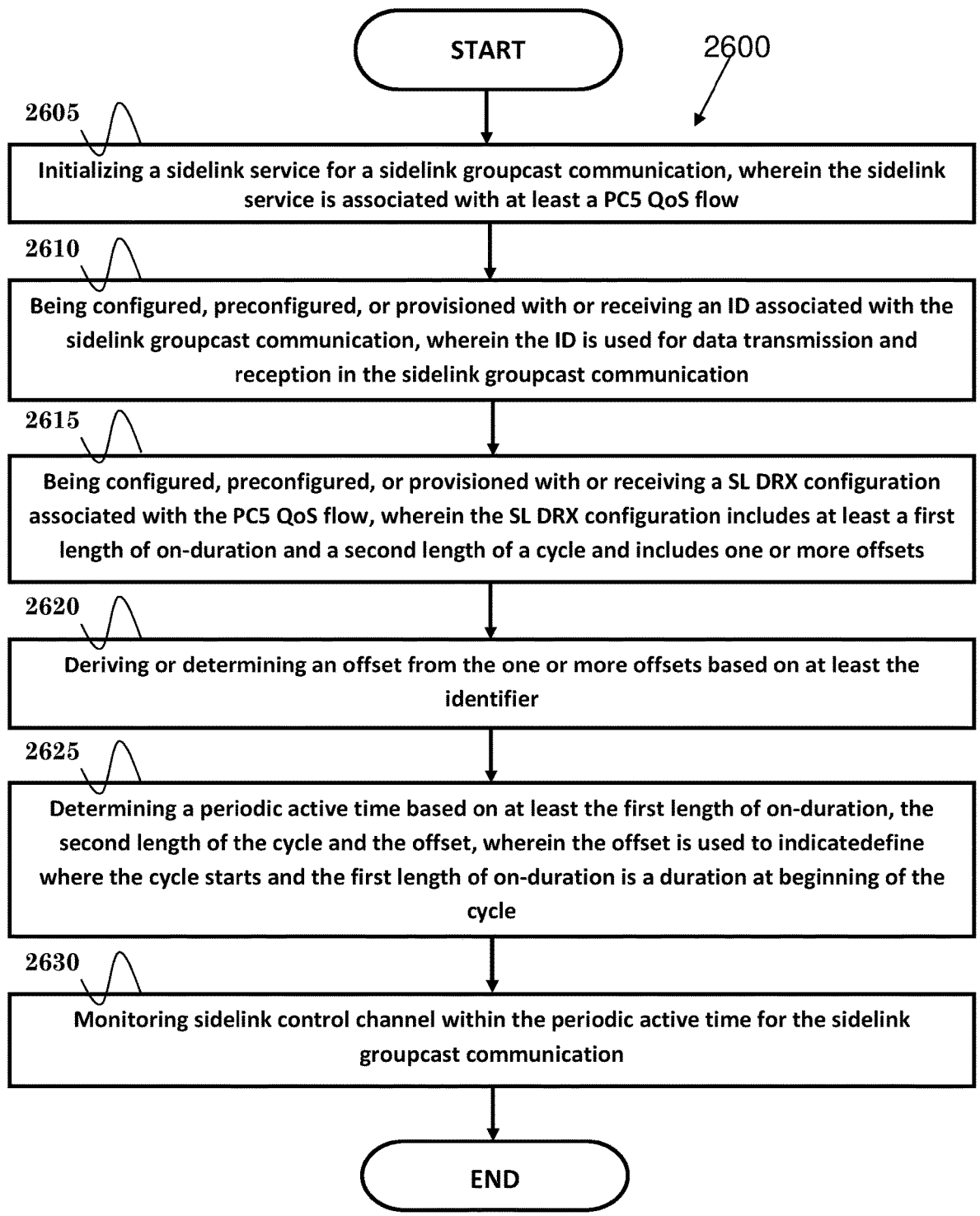
FIG. 26 is a flow chart according to one exemplary embodiment.

FIG. 26 is a flow chart 2600 illustrating a method for a (Rx) UE. In step 2605, the (Rx) UE initializes a sidelink service for a sidelink groupcast communication, wherein the sidelink service is associated with at least a PC5 QoS flow. In step 2610, the (Rx) UE is being configured, preconfigured, or provisioned with or receiving an ID associated with the sidelink groupcast communication, wherein the ID is used for data transmission and reception in the sidelink groupcast communication. In step 2615, the (Rx) UE is being configured, preconfigured, or provisioned with or receiving a SL DRX configuration associated with the PC5 QoS flow, wherein the SL DRX configuration includes at least a first length of on-duration and a second length of a cycle and includes one or more offsets. In step 2620, the (Rx) UE derives or determines an offset from the one or more offsets based on at least the identifier. In step 2625, the (Rx) UE determines a periodic active time based on at least the first length of on-duration, the second length of the cycle and the offset, wherein the offset is used to indicate or define where the cycle starts and the first length of on-duration is a duration at beginning of the cycle. In step 2630, the (Rx) UE monitors sidelink control channel within the periodic active time for the sidelink groupcast communication.

Referring back to FIGS. 3 and 4, in one exemplary embodiment of a method for a (Rx) UE, the (Rx) UE 300 includes a program code 312 stored in the memory 310. The CPU 308 could execute program code 312 to enable the (Rx) UE (i) to initialize a sidelink service for a sidelink groupcast communication, wherein the sidelink service is associated with at least a PC5 QoS flow, (ii) to be configured, preconfigured, or provisioned with or receiving an ID associated with the sidelink groupcast communication, wherein the ID is used for data transmission and reception in the sidelink groupcast communication, (iii) to be configured, preconfigured, or provisioned with or receiving a SL DRX configuration associated with the PC5 QoS flow, wherein the SL DRX configuration includes at least a first length of on-duration and a second length of a cycle and includes one or more offsets, (iv) to derive or determine an offset from the one or more offsets based on at least the identifier, (v) to determine a periodic active time based on at least the first length of on-duration, the second length of the cycle and the offset, wherein the offset is used to indicate or define where the cycle starts and the first length of on-duration is a duration at beginning of the cycle, and (vi) to monitor sidelink control channel within the periodic active time for the sidelink groupcast communication. Furthermore, the CPU 308 can execute the program code 312 to perform all of the above-described actions and steps or others described herein.

Figure 27:
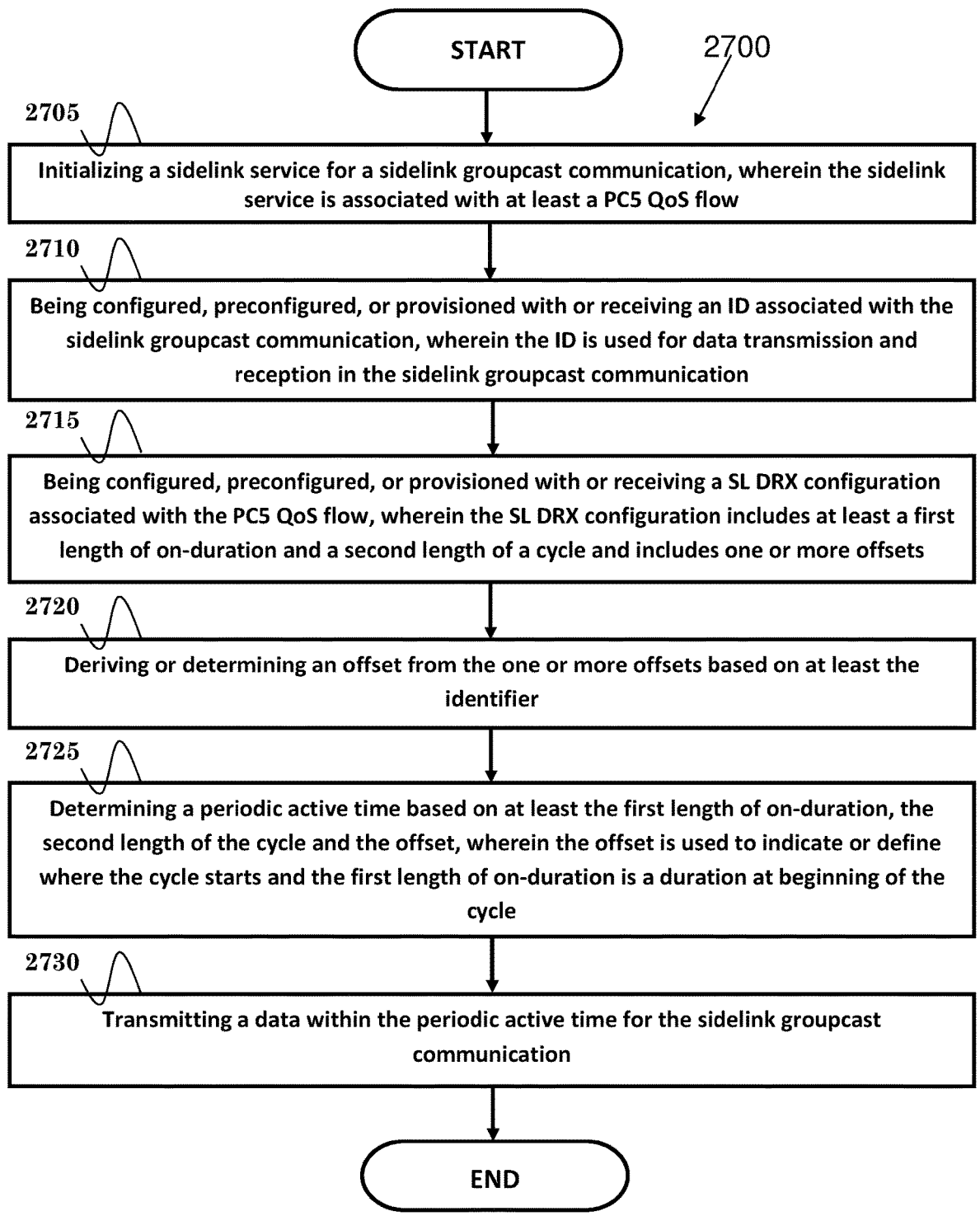
FIG. 27 is a flow chart according to one exemplary embodiment.

FIG. 27 is a flow chart 2700 illustrating a method for a (Tx) UE. In step 2705, the (Tx) UE initializes a sidelink service for a sidelink groupcast communication, wherein the sidelink service is associated with at least a PC5 QoS flow. In step 2710, the (Tx) UE is being configured, preconfigured, or provisioned with or receiving an ID associated with the sidelink groupcast communication, wherein the ID is used for data transmission and reception in the sidelink groupcast communication. In step 2715, the (Tx) UE is being configured, preconfigured, or provisioned with or receiving a SL DRX configuration associated with the PC5 QoS flow, wherein the SL DRX configuration includes at least a first length of on-duration and a second length of a cycle and includes one or more offsets. In step 2720, the (Tx) UE derives or determines an offset from the one or more offsets based on at least the identifier. In step 2725, the (Tx) UE determines a periodic active time based on at least the first length of on-duration, the second length of the cycle and the offset, wherein the offset is used to indicate or define where the cycle starts and the first length of on-duration is a duration at beginning of the cycle. In step 2730, the (Tx) UE transmits a data within the periodic active time for the sidelink groupcast communication.

Referring back to FIGS. 3 and 4, in one exemplary embodiment of a method for a (Tx) UE, the (Tx) UE 300 includes a program code 312 stored in the memory 310. The CPU 308 could execute program code 312 to enable the (Tx) UE (i) to initialize a sidelink service for a sidelink groupcast communication, wherein the sidelink service is associated with at least a PC5 QoS flow, (ii) to be configured, preconfigured, or provisioned with or receiving an ID associated with the sidelink groupcast communication, wherein the ID is used for data transmission and reception in the sidelink groupcast communication, (iii) to be configured, preconfigured, or provisioned with or receiving a SL DRX configuration associated with the PC5 QoS flow, wherein the SL DRX configuration includes at least a first length of on-duration and a second length of a cycle and includes one or more offsets, (iv) to derive or determine an offset from the one or more offsets based on at least the identifier, (v) to determine a periodic active time based on at least the first length of on-duration, the second length of the cycle and the offset, wherein the offset is used to indicate or define where the cycle starts and the first length of on-duration is a duration at beginning of the cycle, and (vi) to transmit a data within the periodic active time for the sidelink groupcast communication. Furthermore, the CPU 308 can execute the program code 312 to perform all of the above-described actions and steps or others described herein.

Figure 28:
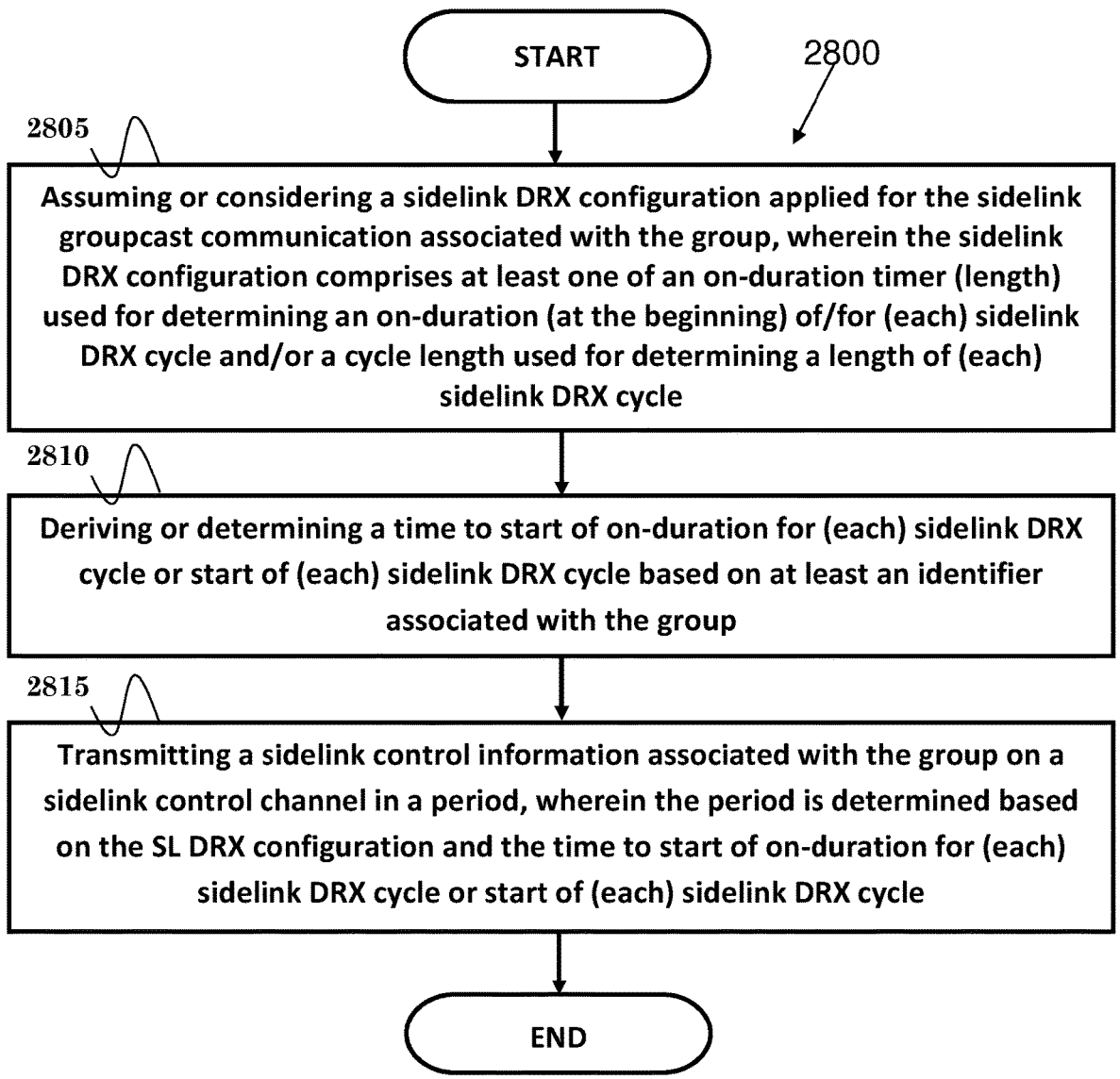
FIG. 28 is a flow chart according to one exemplary embodiment.

FIG. 28 is a flow chart 2800 illustrating a method for a UE to consider SL DRX for sidelink groupcast communication associated with a group. In step 2805, the UE assumes or considers a sidelink DRX configuration applied for the sidelink groupcast communication associated with the group, wherein the sidelink DRX configuration comprises at least one of an on-duration timer (length) used for determining an on-duration (at the beginning) of/for (each) sidelink DRX cycle and/or a cycle length used for determining a length of (each) sidelink DRX cycle. In step 2810, the UE derives or determines a time to start of on-duration for (each) sidelink DRX cycle or start of (each) sidelink DRX cycle based on at least an identifier associated with the group. In step 2815, the UE transmits a sidelink control information associated with the group on a sidelink control channel in a period, wherein the period is determined based on the SL DRX configuration and the time to start of on-duration for (each) sidelink DRX cycle or start of (each) sidelink DRX cycle.

In one embodiment, the sidelink DRX configuration may not comprise the time to start of on-duration for (each) sidelink DRX cycle or start of (each) sidelink DRX cycle. The time to start of on-duration for (each) sidelink DRX cycle or start of (each) sidelink DRX cycle may be a startOffset, and/or unit of the time to start of on-duration for (each) sidelink DRX cycle or start of (each) sidelink DRX cycle may be subframe.

In one embodiment, the derived or determined time to start of on-duration for (each) sidelink DRX cycle or start of (each) sidelink DRX cycle may be (equal to) a derived value of "((part of) the identifier) mod (the cycle length)". The derived or determined time to start of on-duration for each sidelink DRX cycle or start of each sidelink DRX cycle may also be (equal to) a derived value of "(the identifier) mod (the cycle length)". Mod means modulo or modulus.

In one embodiment, the UE may have information indicating one or more time to start of on-duration for (each) sidelink DRX cycle or start of (each) sidelink DRX cycle, and/or the UE derives or determines the time to start of on-duration for (each) sidelink DRX cycle or start of (each) sidelink DRX cycle based on at least the identifier associated with the group and the information. The UE may determine or derive an index based on at least the identifier associated with the group, and the UE may derive or determine the time to start of on-duration for (each) sidelink DRX cycle or start of (each) sidelink DRX cycle, from the one or more time to start of on-duration for (each) sidelink DRX cycle or start of (each) sidelink DRX cycle, based on the index.

In one embodiment, the identifier associated with the group may be a (part of) groupcast destination Layer-2 ID. The identifier associated with the group may also be a groupcast destination Layer-2 identifier. The period may be an active time on which at least an on-duration timer is running.

Referring back to FIGS. 3 and 4, in one exemplary embodiment of a method for a UE to consider SL DRX for sidelink groupcast communication associated with a group, the UE 300 includes a program code 312 stored in the memory 310. The CPU 308 could execute program code 312 to enable the UE (i) to assume or consider a sidelink DRX configuration applied for the sidelink groupcast communication associated with the group, wherein the sidelink DRX configuration comprises at least one of an on-duration timer (length) used for determining an on-duration (at the beginning) of/for (each) sidelink DRX cycle and/or a cycle length used for determining a length of (each) sidelink DRX cycle, (ii) to derive or determine a time to start of on-duration for (each) sidelink DRX cycle or start of (each) sidelink DRX cycle based on at least an identifier associated with the group, and (iii) to transmit a sidelink control information associated with the group on a sidelink control channel in a period, wherein the period is determined based on the SL DRX configuration and the time to start of on-duration for (each) sidelink DRX cycle or start of (each) sidelink DRX cycle. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE) to consider sidelink discontinuous reception (DRX) for sidelink groupcast communication associated with a group, comprising:
   obtaining or being configured with a sidelink DRX configuration applied for the sidelink groupcast communication associated with the group, wherein the sidelink DRX configuration comprises at least one of an on-duration timer length used for determining an on-duration at the beginning of each sidelink DRX cycle or a cycle length used for determining a length of each sidelink DRX cycle;
   determining an identifier associated with the group;
   deriving or determining a time to start of on-duration for each sidelink DRX cycle or start of each sidelink DRX cycle based on (i) a derived value of "(part of the identifier) mod (the cycle length)" or (ii) a derived value of "(the identifier) mod (the cycle length)"; and
   transmitting a sidelink control information associated with the group on a sidelink control channel in a period, wherein the period is determined based on the sidelink DRX configuration and the time to start of on-duration for each sidelink DRX cycle or start of each sidelink DRX cycle.

2. The method of claim 1, wherein the sidelink DRX configuration does not comprise the time to start of on-duration for each sidelink DRX cycle or start of each sidelink DRX cycle.

3. The method of claim 1, wherein at least one of:
   the time to start of on-duration for each sidelink DRX cycle or start of each sidelink DRX cycle is a startOffset; or
   a unit of the time to start of on-duration for each sidelink DRX cycle or start of each sidelink DRX cycle is subframe.

4. The method of claim 1,
   wherein a value for the time to start of on-duration for each sidelink DRX cycle or start of each sidelink DRX cycle is equal to the derived value of "(part of the identifier) mod (the cycle length)", or
   wherein a value for the time to start of on-duration for each sidelink DRX cycle or start of each sidelink DRX cycle is equal to the derived value of "(the identifier) mod (the cycle length)".

5. The method of claim 1,
   wherein the UE has information indicating one or more time to start of on-duration for each sidelink DRX cycle or start of each sidelink DRX cycle;
   wherein the UE derives or determines the time to start of on-duration for each sidelink DRX cycle or start of each sidelink DRX cycle based on at least the identifier associated with the group and the information.

6. The method of claim 5, wherein the UE determines or derives an index based on at least the identifier associated with the group, and
   wherein the UE derives or determines the time to start of on-duration for each sidelink DRX cycle or start of each sidelink DRX cycle, from the one or more time to start of on-duration for each sidelink DRX cycle or start of each sidelink DRX cycle, based on the index.

7. The method of claim 1, wherein the identifier associated with the group is a part of groupcast destination Layer-2 identifier, or
wherein the identifier associated with the group is a groupcast destination Layer-2 identifier.

8. The method of claim 1, wherein the period is an active time on which at least an on-duration timer is running.

9. A User Equipment (UE), comprising:
a control circuit;
a processor installed in the control circuit; and
a memory installed in the control circuit and operatively coupled to the processor;
wherein the processor is configured to execute a program code stored in the memory to:
obtain or be configured with a sidelink DRX configuration applied for a the sidelink groupcast communication associated with a group, wherein the sidelink DRX configuration comprises at least one of an on-duration timer length used for determining an on-duration at the beginning of each sidelink DRX cycle or a cycle length used for determining a length of each sidelink DRX cycle;
determine an identifier associated with the group;
derive or determine a time to start of on-duration for each sidelink DRX cycle or start of each sidelink DRX cycle based on (i) a derived value of "(part of the identifier) mod (the cycle length)" or (ii) a derived value of "(the identifier) mod (the cycle length)"; and
transmit a sidelink control information associated with the group on a sidelink control channel in a period, wherein the period is determined based on the sidelink DRX configuration and the time to start of on-duration for each sidelink DRX cycle or start of each sidelink DRX cycle.

10. The UE of claim 9, wherein the sidelink DRX configuration does not comprise the time to start of on-duration for each sidelink DRX cycle or start of each sidelink DRX cycle.

11. The UE of claim 9, wherein at least one of:
the time to start of on-duration for each sidelink DRX cycle or start of each sidelink DRX cycle is a startOffset; or
a unit of the time to start of on-duration for each sidelink DRX cycle or start of each sidelink DRX cycle is subframe.

12. The UE of claim 9,
wherein a value for the time to start of on-duration for each sidelink DRX cycle or start of each sidelink DRX cycle is equal to the derived value of "(part of the identifier) mod (the cycle length)", or
wherein a value for the time to start of on-duration for each sidelink DRX cycle or start of each sidelink DRX cycle is equal to the derived value of "(the identifier) mod (the cycle length)".

13. The UE of claim 9,
wherein the UE has information indicating one or more time to start of on-duration for each sidelink DRX cycle or start of each sidelink DRX cycle; or
wherein the UE derives or determines the time to start of on-duration for each sidelink DRX cycle or start of each sidelink DRX cycle based on at least the identifier associated with the group and the information.

14. The UE of claim 13, wherein the UE determines or derives an index based on at least the identifier associated with the group, and
wherein the UE derives or determines the time to start of on-duration for each sidelink DRX cycle or start of each sidelink DRX cycle, from the one or more time to start of on-duration for each sidelink DRX cycle or start of each sidelink DRX cycle, based on the index.

15. The UE of claim 9, wherein the identifier associated with the group is a part of groupcast destination Layer-2 identifier, or
wherein the identifier associated with the group is a groupcast destination Layer-2 identifier.

16. The UE of claim 9, wherein the period is an active time on which at least an on-duration timer is running.

17. A non-transitory computer-readable medium comprising processor-executable instructions that when executed by a User Equipment (UE) cause performance of operations, the operations comprising:
obtaining or being configured with a sidelink DRX configuration applied for a sidelink groupcast communication associated with a group, wherein the sidelink DRX configuration comprises at least one of an on-duration timer length used for determining an on-duration at the beginning of each sidelink DRX cycle or a cycle length used for determining a length of each sidelink DRX cycle;
determining an identifier associated with the group;
deriving or determining a time to start of on-duration for each sidelink DRX cycle or start of each sidelink DRX cycle based on (i) a derived value of "(part of the identifier) mod (the cycle length)" or (ii) a derived value of "(the identifier) mod (the cycle length)"; and
transmitting a sidelink control information associated with the group on a sidelink control channel in a period, wherein the period is determined based on the sidelink DRX configuration and the time to start of on-duration for each sidelink DRX cycle or start of each sidelink DRX cycle.

18. The non-transitory computer-readable medium of claim 17, wherein the sidelink DRX configuration does not comprise the time to start of on-duration for each sidelink DRX cycle or start of each sidelink DRX cycle.

19. The non-transitory computer-readable medium of claim 17, wherein a value for the time to start of on-duration for each sidelink DRX cycle or start of each sidelink DRX cycle is equal to the derived value of "(part of the identifier) mod (the cycle length)".

20. The non-transitory computer-readable medium of claim 17, wherein a value for the time to start of on-duration for each sidelink DRX cycle or start of each sidelink DRX cycle is equal to the derived value of "(the identifier) mod (the cycle length)".

* * * * *